(12) United States Patent
Akikusa

(10) Patent No.: US 8,288,051 B2
(45) Date of Patent: Oct. 16, 2012

(54) SOLID OXIDE FUEL CELL AND FUEL CELL STACK

(75) Inventor: Jun Akikusa, Naka (JP)

(73) Assignees: Mitsubishi Materials Corporation, Tokyo (JP); The Kansai Electric Power Co., Inc., Osaka (JP)

( * ) Notice: Subject to any disclaimer, the term of this patent is extended or adjusted under 35 U.S.C. 154(b) by 611 days.

(21) Appl. No.: 12/524,271

(22) PCT Filed: Jan. 24, 2008

(86) PCT No.: PCT/JP2008/000076
§ 371 (c)(1),
(2), (4) Date: Jul. 23, 2009

(87) PCT Pub. No.: WO2008/090744
PCT Pub. Date: Jul. 31, 2008

(65) Prior Publication Data
US 2010/0081027 A1    Apr. 1, 2010

(30) Foreign Application Priority Data

Jan. 25, 2007   (JP) ................................ 2007-015131
Oct. 2, 2007    (JP) ................................ 2007-258883
Jan. 15, 2008   (JP) ................................ 2008-005896

(51) Int. Cl.
*H01M 2/38* (2006.01)
*H01M 2/40* (2006.01)
*H01M 8/24* (2006.01)
*H01M 8/10* (2006.01)
*H01M 4/48* (2010.01)

(52) U.S. Cl. ........ 429/457; 429/452; 429/458; 429/460; 429/479; 429/488

(58) Field of Classification Search .................. 429/479, 429/457, 458, 460, 452, 488
See application file for complete search history.

(56) References Cited

U.S. PATENT DOCUMENTS
5,945,232 A * 8/1999 Ernst et al. .................... 429/413
(Continued)

FOREIGN PATENT DOCUMENTS
EP        0 530 451        3/1993
(Continued)

OTHER PUBLICATIONS

International Preliminary Report on Patentability issued Aug. 6, 2009 in the International (PCT) Application No. PCT/JP2008/000076.

(Continued)

*Primary Examiner* — Patrick Ryan
*Assistant Examiner* — Julian Anthony
(74) *Attorney, Agent, or Firm* — Wenderoth, Lind & Ponack, L.L.P.

(57) ABSTRACT

A solid oxide fuel cell includes a separator which has a fuel gas passageway and an oxidant gas passageway thereinside, and a plurality of power generation cells arranged in a parallel connection state on the same plane. Each of the power generation cells has a solid electrolyte layer sandwiched between a fuel electrode layer and an oxidant electrode layer. The oxidant gas passageway may start at an edge portion of the separator, extend to a central portion of the separator at a position enclosed by the power generation cells, be divided at the central portion, and be introduced in a portion facing the respective oxidant electrode layer.

20 Claims, 10 Drawing Sheets

U.S. PATENT DOCUMENTS

2005/0136294 A1 * 6/2005 Tsunoda .................. 429/12

FOREIGN PATENT DOCUMENTS

| JP | 6-310164 | 11/1994 |
|---|---|---|
| JP | 7-22059 | 1/1995 |
| JP | 11-16581 | 1/1999 |
| JP | 2002-8683 | 1/2002 |
| JP | 2002-313370 | 10/2002 |
| JP | 2003-168469 | 6/2003 |
| JP | 2004-273140 | 9/2004 |
| JP | 2005-44599 | 2/2005 |

OTHER PUBLICATIONS

International Search Report issued Apr. 8, 2008 in the International (PCT) Application No. PCT/JP2008/000076.

* cited by examiner

SOLID OXIDE FUEL CELL AND FUEL CELL STACK

TECHNICAL FIELD

The present invention relates to a solid oxide fuel cell including a power generation cell having a solid electrolyte layer sandwiched between a fuel electrode layer and an oxidant electrode layer on both surfaces thereof, and more particularly, to a solid oxide fuel cell configured such that a plurality of power generation cells and separators are laminated alternately in parallel on a same flat surface thereof.

Further, the present invention relates to a fuel cell stack configured such that many power generation cells and separators are laminated alternately on a same flat surface thereof, and more particularly to, temperature equalization in the lamination direction of the fuel cell stack.

BACKGROUND ART

Recently, a fuel cell, which directly converts chemical energy stored in the fuel into electrical energy, has drawn attention as a highly efficient and clean power generating device. The fuel cell has a laminated structure in which a solid electrolyte layer made of an oxide ion conductor is sandwiched between an air electrode (cathode) layer and a fuel electrode (anode) layer from both sides thereof.

At power generation, an oxidant gas (oxygen) is supplied to the air electrode side of the power generation cell, and a fuel gas ($H_2$, $CO$, $CH_4$ or the like) is supplied to the fuel electrode side thereof, as a reactant gas respectively. Both the air electrode layer and fuel electrode layer are made porous so that the reactant gases can reach the boundary surface of the solid electrolyte layer therebetween.

In the power generation cell, the oxygen supplied to the air electrode layer side reaches near the boundary with the solid electrolyte layer through a pore in the air electrode layer, and there, the oxygen receives an electron from the air electrode layer to be ionized into an oxide ion ($O^{2-}$). The oxide ion diffusively moves in the solid electrolyte layer toward the fuel electrode layer. When reaching near the boundary with the fuel electrode layer, the oxide ion reacts there with a fuel gas to produce a reaction product ($H_2O$, $CO_2$ and the like), and emits an electron to the fuel electrode layer. The electrons produced by an electrode reaction can be taken out as an electromotive force by an external load on another route.

The flat plate laminated type fuel cell is configured by alternately laminating many power generation cells and separators to form a stack structure, and then by applying a load in the lamination direction from both ends of the stack so that the individual elements of the stack are pressure-bonded and closely appressed to each other.

The separator has a function of electrically connecting the power generation cells to each other and of supplying reactant gases to the power generation cell. The separator includes thereinside a fuel gas passageway which introduces fuel gases to the fuel electrode layer side, and an oxidant gas passageway which introduces oxidant gases to the air electrode layer side.

FIG. 12 illustrates an example of the above separator. The separator 8 is made of a square stainless-steel plate material with a thickness of several mm, and the above described fuel gas passageway 11 and oxidant gas passageway 12 are spirally formed inside the plate material respectively. A circular power generation cell 5 is arranged on the surface of the separator 8 so as to cover the almost entire surface thereof.

In order to increase power generation output of the solid oxide fuel cell, the separators and the power generation cells need to be formed larger, and hence the solid oxide fuel cell needs to be made larger. However, if the size of a power generation cell exceeds a predetermined size (generally, about a diameter of 120 mm), a temperature distribution tends to occur when the power generation cell is operated. The thermal stress induced by the temperature distribution causes thermal distortion, which causes a problem in that the power generation cell (especially, the solid electrolyte layer) tends to be broken.

In light of such circumstances, conventionally there has been proposed a solid oxide fuel cell having a structure made smaller by arranging a plurality of above described power generation cells on the same separator as disclosed in, for example, Patent Documents 1 to 3.

The Patent Document 1 discloses a fuel cell having an internal manifold structure in which a plurality of power generation cells are disposed between the metallic separators and reaction gas (fuel and air) supply openings are disposed in the middle of the individual power generation cell. The supply openings are required to be sealed, and sealing needs to be performed for the number of power generation cells. Therefore, there is a problem in that the seal structure becomes complicated; and if thermal expansion stress during operation causes the seals to be broken, fuel gases are mixed with air, and the heat induced by the mixing causes the power generation cell to be broken.

Unlike Patent Document 1, Patent Document 2 does not provide a power generation cell with a reactant gas supply opening, but is configured such that fuels and air pass through a gas flow channel inside the separator to be ejected toward the center portion of the power generation cell. Therefore, above described problem with the seal structure can be avoided. However, its external manifold structure requires gas supply pipes for fuels and air for each separator, and thereby its reactant gas supply structure becomes extremely complicated. Further, in the separator, the temperature around the air feed section tends to decrease, and the temperature around the fuel feed section tends to increase. Unfortunately, such an uneven temperature in the separator causes the power generation cells to be broken.

Patent Document 3 provides a structure in which a fuel gas preheating pipe and an air preheating pipe are provided in a cavity in the center of the separator through which reactant gases are supplied to the manifold. This structure allows the temperature in the separator to be kept constant. However, since the fuel gas preheating pipe and the air preheating pipe in the center of the separator are cylindrical, there is no gas flowing from each of the laminated power generation cells to the central portion. Therefore, reactant gases flow such that fuels and air are supplied not evenly over the power generation cell but are concentrated in an outer peripheral region thereof. As a result, there is a problem in that the power generation performance reduces. In addition, the gas pipe structure becomes extremely complicated due to its external manifold structure. Therefore, an unnecessary thermal stress is applied to the stack structure during operation and thereby the power generation cell may be broken or the gas pipe may be broken.

As described above, even the solid oxide fuel cells disclosed in Patent Documents 1 to 3 have a problem in that the power generation cell tends to be broken due to thermal stress or the like.

On the other hand, there has been known a power generation cell configured such that a solid electrolyte layer made of an oxide ion conductor is sandwiched between an air electrode layer and a fuel electrode layer, in which, as described above, when air (oxygen) is supplied to the air electrode layer and a fuel gas ($H_2$, CO, $CH_4$) is supplied to the fuel electrode layer, a power generation reaction occurs between the electrodes to obtain an electromotive force.

In such a power generation cell configured above, its electromotive force per unit cell is extremely small amounting to no more than 1 V. Therefore, in general, many power generation cells are laminated into a stack via a separator and a conductive member such as a current collector to obtain substantial cell output.

However, such a flat plate laminated type fuel cell stack is different in temperature between the individual power generation cells in the lamination direction. As shown by C1 in FIG. 13, the stack temperature tends to be high in the middle portion of the stack and low in the end portion of the stack.

This is because Joule heat of the power generation cell is easier to dissipate outside in the end portion of the fuel cell stack than in the middle portion thereof. Further, in the case of a vertically mounted fuel cell stack having a vertical stack lamination direction, the stack's upper portion is heated by an increasing high-temperature exhaust gas. Therefore, the temperature becomes high in the upper end portion and low in the lower end portion.

The power generation cells in a portion having a low temperature are inactive in the electrode reaction, and thus its internal resistance is large, and the power generation performance thereof is lower than that of the power generation cells in the middle portion of the stack having a high temperature.

As described above, the fuel cell stack in which a temperature distribution occurs in the lamination direction thereof has a problem in that efficient power generation cannot be achieved since the total power generation performance is limited by the power generation performance of the power generation cells located in a low temperature portion. The more the number of laminated stacks, the more significant this trend.

Further, the power generation cells in a high temperature portion have good power generation performance, but the components such as power generation cells and separators are more frequently exposed to high temperatures than other components and thus have a problem of being easily deteriorate or broken.

As a technique for equalizing the temperature in the lamination direction of the fuel cell stack, for example, Patent Document 4 is disclosed. According to Patent Document 4, a heat dissipating fin is provided for each separator in a laminated state to improve thermal radiation of the separator, thereby controlling the temperature distribution of the fuel cell stack (lowering the stack temperature by heat dissipation). However, such a control of thermal radiation by heat dissipating fins cannot increase the temperature of, particularly the lower end portion of the stack whose temperature lowers.

Accordingly, the above techniques can reduce the temperature distribution in the lamination direction of the stack to some extent, but the power generation performance of the power generation cells located in the lower end portion of the stack is still kept low. Therefore, the total power generation performance of the fuel cell stack is not satisfiable at all.

Patent Document 1: Japanese Patent Laid-Open No. 06-310164
Patent Document 2: Japanese Patent Laid-Open No. 2002-008683
Patent Document 3: Japanese Patent Laid-Open No. 2003-168469
Patent Document 4: Japanese Patent Laid-Open No. 2004-273140

DISCLOSURE OF THE INVENTION

A first object of the present invention is to provide a solid oxide fuel cell having a simple structure and capable of preventing the power generation cell from being broken.

A second object of the present invention is to provide a highly efficient fuel cell stack in which an exhaust gas flow channel is provided inside the fuel cell stack to flow exhaust gas emitted from a power generation cell in a lamination direction of the stack, particularly, the temperature of the end portion of the stack is increased by the heat of the exhaust gas to equalize the temperature in the lamination direction of the stack, and thereby the power generation performance of the power generation cell located in the end portion of the stack is improved.

First Aspect of the Present Invention

In order to achieve the above first object, the solid oxide fuel cell in accordance with the first aspect of the present invention is characterized in that a plurality of power generation cells having a solid electrolyte layer sandwiched between a fuel electrode layer and an oxidant electrode layer on both surfaces thereof are arranged in a parallel connection state on a same plane, the plurality of power generation cells are laminated into a plurality of layers via a separator including a fuel gas passageway and an oxidant gas passageway thereinside, and the laminated body includes an oxidant gas manifold and a fuel gas manifold communicatively connected to the oxidant gas passageway and the fuel gas passageway of the individual separator and penetrating in a lamination direction, wherein the separator includes an oxidant gas hole communicatively connected to the oxidant gas manifold and a fuel gas hole communicatively connected to the fuel gas manifold, wherein one end of the oxidant gas passageway is communicatively connected to the oxidant gas hole, and the other end thereof, where the oxidant gas passageway is divided or a plurality of the oxidant gas passageways are provided, is opened at a portion facing the individual oxidant electrode layer, and wherein one end of the fuel gas passageway is communicatively connected to the fuel gas hole, and the other end thereof, where the fuel gas passageway is divided or a plurality of the fuel gas passageways are provided, is opened at a portion facing the individual fuel electrode layer.

Here, "the oxidant gas passageway is divided or a plurality of the oxidant gas passageways are provided" is meant to include "a plurality of oxidant gas passageways are provided and the oxidant gas passageways are divided." Likewise, "the fuel gas passageway is divided or a plurality of the fuel gas passageways are provided" is meant to include "a plurality of fuel gas passageways are provided and the fuel gas passageways are divided."

The solid oxide fuel cell can be configured such that the oxidant gas passageway passes through a center portion of a position enclosed by the power generation cells of the separator and is introduced into a portion facing individual the oxidant electrode layer.

Further, it can be configured that the plurality of power generation cells are arranged up-down left-right symmetrically in the center portion of the separator, wherein the oxidant gas hole communicatively connected to the oxidant gas manifold and the fuel gas hole communicatively connected to the fuel gas manifold are arranged in a pair of facing corner portions of the separator, wherein the oxidant gas passageway starts at an edge portion of the separator, reaches a center portion of a position enclosed by the plurality of power generation cells, is divided at the center portion, and is introduced in a portion facing individual the oxidant electrode layer.

Further, it can be configured that at least the fuel gas passageway is divided into two in a direction orthogonal to the passage direction and is introduced into a portion facing individual the fuel electrode layer. In this case, it is preferable that a sectional area of a gas passageway be reduced for each branch.

Further, the solid oxide fuel cell can be configured such that an oxidant gas hole communicatively connected to the oxidant gas manifold is arranged in a position enclosed by the power generation cells, and a plurality of the oxidant gas passageways are provided, each of which is introduced from the position enclosed by the power generation cells to a portion facing individual the oxidant electrode layer.

Further, it can be configured that the power generation cell has a sealless structure in which gases remaining unconsumed by power generation reaction are discharged outside from a peripheral portion of the power generation cell, and a gas outlet hole portion penetrating in a thickness direction is provided in a center portion of the separator corresponding to a position enclosed by the plurality of power generation cells.

According to the first aspect of the present invention, the structure in which a plurality of power generation cells are arranged in a parallel connection state on a same separator allows the size of an individual power generation cell to be made smaller than the structure in which one power generation cell is placed on one separator, thereby allowing the temperature distribution to be equalized and making the power generation cell hard to be broken. In addition, even if one of the power generation cells is broken, power can be obtained from the other normal power generation cells, thereby allowing the operation to continue without an extreme decrease in output.

Further, the structure in which a plurality of oxidant gas passageways and fuel gas passageways are provided or the passageway is divided, and an oxidant gas and a fuel gas are supplied to each of the plurality of parallel arranged power generation cells allows the required gas seal portions to be limited to only two portions, the oxidant gas hole and the fuel gas hole regardless of the number of arranged power generation cells. Accordingly, the seal structure of the separator can be simplified, the reliability of the seal structure with respect to thermal stress during operation can be improved, as well as a contribution can be made to prevent the power generation cell from being broken.

Further, the oxidant gas passageway passes through a center portion of a position enclosed by the power generation cells of the separator and is introduced into a portion facing the oxidant electrode layer, and thus the cooling effect of the oxidant gas can suppress an increase in temperature in the center portion of the separator corresponding to the position enclosed by the power generation cells, thereby equalizing the temperature distribution in the separator surface and preventing the power generation cell from being broken.

Further, the oxidant gas passageway is divided at the center portion of the separator, and thus the oxidant gas can efficiently heated, as well as the cooling effect thereof can efficiently suppress an increase in temperature in the center portion of the separator, thereby equalizing the temperature distribution in the separator surface and more reliably preventing the power generation cell from being broken. In addition, the oxidant gas hole and the fuel gas hole are arranged in a pair of facing corner portions of the separator, and thus the total length of the gas flow channels can be made longer. The oxidant gas and the fuel gas are sufficiently heated, and then introduced into the power generation cell, thereby improving the power generation performance.

Further, the fuel gas passageway is configured to be divided into a T shape, and thus the fuel gases can be evenly distributed at a branch portion as well as the total length of the gas flow channels can be made longer, thereby allowing the fuel gases to be distributed evenly to the individual fuel electrode layer and improving the power generation performance.

Further, the sectional area of the gas passageway is reduced for each branch portion toward the downstream side of the gas flow channel so as to equalize the flow resistance of the divided individual gas passageway, thereby more reliably allowing the fuel gases to be distributed evenly.

Further, the oxidant gas hole is arranged in a position enclosed by the power generation cells, and thus an increase in temperature in the center portion of the separator can be efficiently suppressed. Even if the total length of the oxidant gas passageways can be shortened, the oxidant gases can be evenly distributed, and the separator structure can be simplified to allow the entire fuel cell to be made smaller.

Further, the gas outlet hole portions provided in the center portion of the separator can prevent the reactant gases discharged from the outer periphery of the power generation cells from remaining around the center portion of the separator, can efficiently discharge the reactant gases from the hole portions, and can efficiently supply the oxidant gases and fuel gases to the entire surfaces of the individual electrode layers, thereby improving the power generation performance.

Second Aspect of the Present Invention

In order to achieve the second embodiment, the fuel cell stack in accordance with the second aspect of the present invention is characterized in that the fuel cell stack is a fuel cell stack where a plurality of power generation cells are provided on a same plane, and the plurality of power generation cells are laminated into a plurality of layers via a separator, wherein inside the stack, there is provided an exhaust gas flow channel for flowing an exhaust gas after power generation reaction in a lamination direction, and the amount of gas flow to one side of the lamination direction is made larger than the amount of gas flow to the other side of the lamination direction in the exhaust gas flow channel.

The fuel cell stack can be configured such that the power generation cell has a sealless structure in which exhaust gases after power generation reaction are discharged from a peripheral portion thereof, and a gas outlet hole penetrating in a lamination direction is provided in a portion of individual separator corresponding to a position enclosed by the plurality of power generation cells, and the exhaust gas flows in a lamination direction through the gas outlet hole.

In this case, it is preferable that the size of the gas outlet hole of the separator located in an end portion of the other side of the lamination direction of the stack be made smaller than the size of the gas outlet hole of another separator.

This allows the exhaust gas flow to occur mainly from the other side of the stack's lamination direction to the one side thereof inside the exhaust gas flow channel.

Further, it is preferable to provide a cover mechanism for adjusting the opening of the gas outlet hole of the separator located in the end portion of the other side of the lamination direction of the stack.

Further, the fuel cell stack can be configured such that an end plate is provided respectively at both ends of the stack, and a gas outlet for discharging an exhaust gas inside the exhaust gas flow channel to outside the stack is provided in an end plate of the end portion at one side of the lamination direction.

According to the second aspect of the present invention, inside the stack, there is provided an exhaust gas flow channel for flowing an exhaust gas after power generation reaction in a lamination direction, and the amount of gas flow to one side of the lamination direction is made larger than the amount of gas flow to the other side of the lamination direction in the exhaust gas flow channel. Therefore, in the stack's middle portion having a relatively high temperature, the exhaust gases from the power generation cells flow inside the exhaust gas flow channel and can improve the heat dissipating properties of the power generation cell, thereby reducing the temperature in the stack's middle portion; and in the stack's end portion having a low temperature, heat of the exhaust gases flowing in the lamination direction increases the temperature of the stack, thereby decreasing the temperature distribution (equalizing the heat) in the lamination direction of the stack.

Particularly, in the vertical installation type fuel cell stack, an exhaust gas flow which occurs downward, namely, one side of the lamination direction, in the exhaust gas flow channel can increase the temperature in the stack's lower end portion having the lowest temperature to a level higher than the stack's average temperature. As a result, the power generation performance of the power generation cells at the stack's lower end portion is improved, thereby improving the total power generation performance of the fuel cell stack.

In addition, as described above, the exhaust gas flow into the gas outlet hole can improve the heat dissipating properties, can reduce the temperature in the stack's middle portion, and can relax the thermal stress to the individual components such as the power generation cells and the separators in the stack's middle portion, thereby improving the durability and the reliability of the fuel cell stack.

Further, the gas outlet hole provided in a portion of the separator corresponding to the position enclosed by a plurality of power generation cells can prevent the exhaust gases discharged from the outer peripheral portion of the power generation cells from remaining in the peripheral portion of the power generation cells and can flow in the lamination direction inside the exhaust gas flow channel through the gas outlet hole.

Accordingly, the reactant gases are smoothly supplied to individual power generation cells, thereby improving the power generation performance of the individual power generation cells. In addition, in the stack's middle portion having a relatively high temperature, the heat dissipating properties of the power generation cells can be improved to reduce the temperature in the stack's middle portion; as well as in the stack's end portion having a low temperature, heat of the exhaust gases flowing in the lamination direction increases the temperature of the stack, thereby decreasing the temperature distribution in the lamination direction of the stack.

Further, the size of the gas outlet hole of the separator located at an end portion at the other side of the lamination direction of the stack is made smaller than the size of the gas outlet hole of the other separator, and thus the amount of exhaust gas passing through at the other side of the lamination direction inside the exhaust gas flow channel is reduced, thereby causing the exhaust gas flow to occur inside the exhaust gas flow channel mainly toward one side of the lamination direction.

Particularly, in the vertical installation type of fuel cell stack, the exhaust gas heat can be used to increase the temperature in the stack's lower end portion having the lowest temperature, which is one side of the lamination direction, to a level higher than the average temperature of the stack. As a result, the power generation performance of the power generation cells at the stack's lower end portion is improved, thereby improving the total power generation performance of the fuel cell stack.

Further, there is provided a cover mechanism for adjusting the opening of the gas outlet hole of the separator located at an end portion of the other side of the stack's lamination direction and thus the opening of the gas outlet hole can be adjusted according to the state (i.e., number of laminated layers in the stack and electrical power density) of the temperature distribution in the lamination direction of the stack. More specifically, the amount of gases flowing upward and the amount of gases flowing downward in the lamination direction inside the exhaust gas flow channel can be appropriately adjusted to balance the temperature at both ends of the stack, thereby more reliably reducing the temperature distribution in the lamination direction of the stack and assuring uniform distribution of the stack temperature.

Further, the gas outlet for discharging the exhaust gases emitted from inside the exhaust gas flow channel to outside the stack is provided in an end plate at one side of the lamination direction, and thus the exhaust gases smoothly flow toward one side of the lamination direction inside the exhaust gas flow channel, thereby efficiently increasing the temperature of the end portion of the stack.

DESCRIPTION OF SYMBOLS

| | |
|---|---|
| 1 | Solid oxide fuel cell |
| 2 | Solid electrolyte layer |
| 3 | Fuel electrode layer |
| 4 | Oxidant electrode layer |

-continued

| | |
|---|---|
| 5 | Power generation cell |
| 8, 9, 95 | Separator |
| 11, 91, 96 | Fuel gas passageway |
| 12, 92, 97 | Oxidant gas passageway |
| 13, 43 | Fuel gas hole |
| 14, 44 | Oxidant gas hole |
| 17 | Fuel gas manifold |
| 18 | Oxidant gas manifold |
| 31, 93 | Gas outlet hole portion |
| 101 | Fuel cell stack |
| 105 (105a to 105d) | Power generation cell |
| 108 | Separator |
| 109a, 109b | End plate |
| 121 | Gas outlet opening |
| 129 | Cover mechanism |
| 130 | Exhaust gas flow channel |
| 131 | Gas outlet hole |

BEST MODE FOR CARRYING OUT THE INVENTION

First Embodiment

A first to third embodiments correspond to a first aspect of the present invention.

Hereinafter, the first embodiment of the solid oxide fuel cell in accordance with the present invention will be described with reference to drawings.

Figure 1:
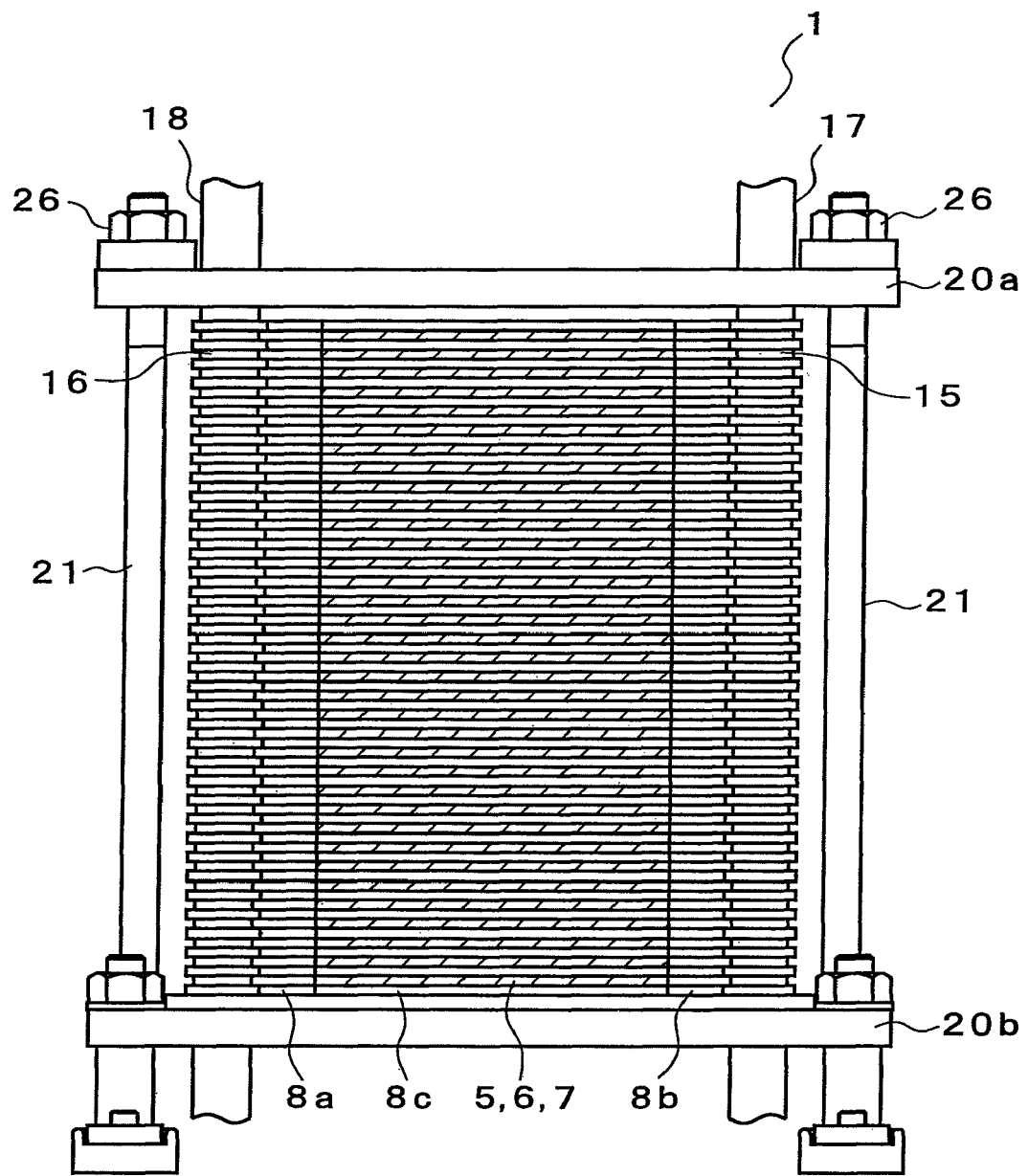
FIG. 1 is a drawing showing a configuration of a flat plate laminated type of solid oxide fuel cell in accordance with a first embodiment.
Figure 2:
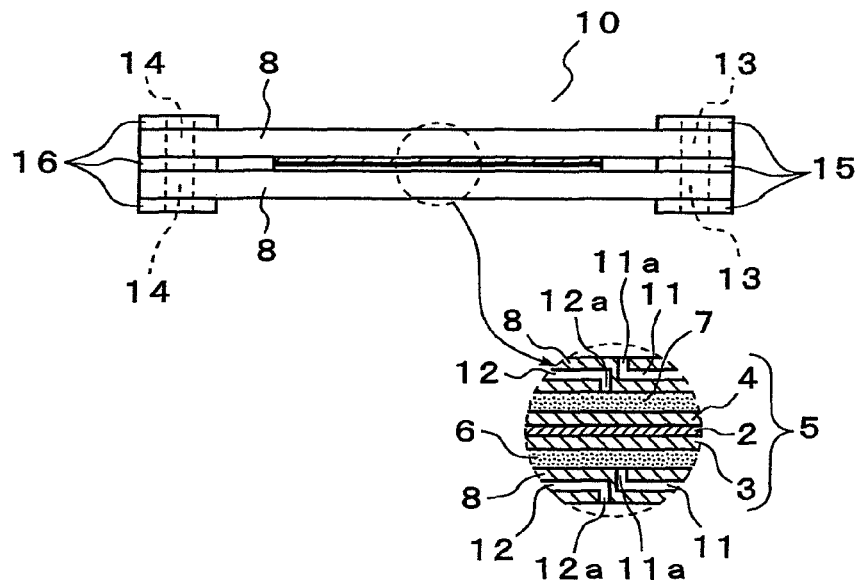
FIG. 2 is a partially enlarged view of FIG. 1.

FIG. 1 shows a configuration of the flat plate laminated type of solid oxide fuel cell 1 to which the present invention is applied; FIG. 2 is a partially enlarged view of FIG. 1; and FIG. 3 shows a structure of the separator 8.

As shown in FIG. 2, a unit cell 10 includes a plurality of (four) power generation cells 5 having a solid electrolyte layer 2 sandwiched between a fuel electrode layer 3 and an oxidant electrode layer 4 on both surfaces thereof; a fuel electrode current collector 6 provided outside the individual fuel electrode layer 3; an air electrode current collector 7 provided outside the individual oxidant electrode layer 4; and upper and lower two separators 8 provided outside the current collectors 6 and 7.

Of these power generation elements, the solid electrolyte layer 2 is made of yttria-stabilized zirconia (YSZ) or the like; the fuel electrode layer 3 is made of a metal such as Ni or a cermet such as Ni—YSZ; the oxidant electrode layer 4 is made of $LaMnO_3$, $LaCoO_3$, or the like; the fuel electrode current collector 6 is made of a sponge-like porous sintered metal plate such as Ni; and the air electrode current collector 7 is made of a sponge-like porous sintered metal plate such as Ag.

Figure 3:
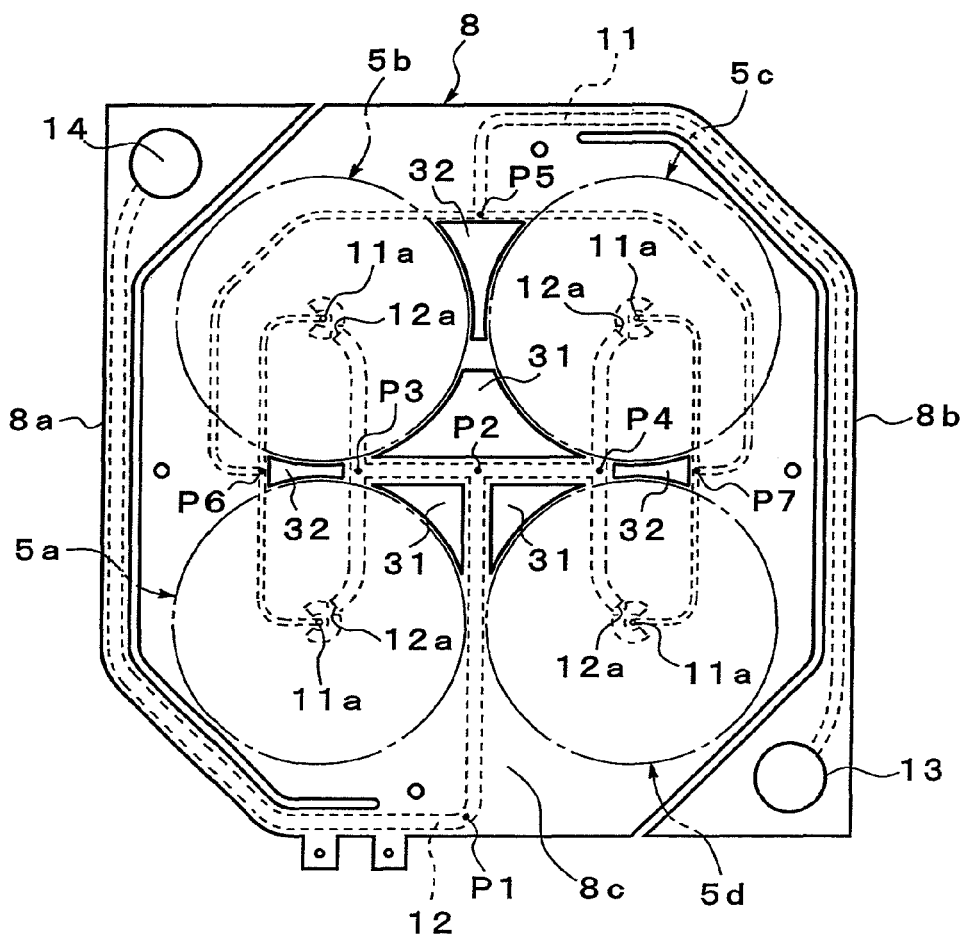
FIG. 3 is a drawing showing a structure of the separator in FIG. 1.

As shown in FIG. 3, the separator 8 is made of a substantially square-shaped stainless-steel plate material with a thickness of several mm and includes a plurality of power generation cells 5 (5a to 5d) described above; a separator body 8c in the middle thereof on which the individual current collectors 6 and 7 are laminated; and separator arms 8a and 8b which extend in the plane direction from the separator body 8c and support the mutually facing edge portions of the separator body 8c at two positions.

As shown by the one-dot chain line in FIG. 3, the power generation cells 5a to 5d each having a small diameter of about 60 mm arranged up-down left-right symmetrically in the center portion of the separator body 8c.

The separator 8 has a function of electrically connecting the power generation cells 5a to 5d in parallel via common current collectors 6 and 7 as well as a function of supplying reactant gases (oxidant gases and fuel gases) to the individual power generation cells 5a to 5d, and has an oxidant gas passageway 12 and a fuel gas passageway 11 thereinside.

Each of the separator arms 8a and 8b extends along the outer periphery of the separator body 8c from the mutually facing corner portion thereof having a slight space, a long strip shape, and flexibility in the lamination direction so that a load in the lamination direction is applied evenly on the entire surface of the separator body 8c as well as a pair of gas holes (oxidant gas hole 14 and fuel gas hole 13) penetrating through in the plate thickness direction are provided on the end portions of the separator arms 8a and 8b.

The oxidant gas hole 14 is communicatively connected to the oxidant gas passageway 12 of the separator 8; and the fuel gas hole 13 is communicatively connected to the fuel gas passageway 11 thereof so that the oxidant gases and fuel gases pass from the individual gas holes 14 and 13 through the gas passageways 12 and 11 to reach the gas discharge outlets 12a and 11a at the passageway terminal ends to be discharged to the center portions of the individual electrode surfaces (oxidant electrode layer 4 and fuel electrode layer 3) of the individual power generation cell 5 therefrom.

More specifically, the oxidant gas passageway 12 starts at the oxidant gas hole 14 passing through inside the separator arm 8a to reach a lower center position P1 of the separator 8 thereof. Then, the oxidant gas passageway 12 turns at the position P1 toward inside the separator body 8c to reach a center position P2 enclosed by the power generation cells 5a to 5d. Then, the oxidant gas passageway 12 is divided at the center position P2 horizontally into a T-shape. One of the divided oxidant gas passageways 12 reaches a middle position P3 between the power generation cells 5a and 5b and further is divided at the middle position P3 vertically into a T shape. Each of the divided oxidant gas passageways 12 is communicatively connected to oxidant gas discharge outlets 12a and 12a each of which corresponds to power generation cells 5a and 5b and is opened on the separator surface corresponding to the center position thereof.

The other one (right in the figure) of the oxidant gas passageway 12 divided at the center position P2 horizontally into a T-shape reaches a middle position P4 between the power generation cells 5c and 5d and further is divided at the position P4 vertically into a T shape. Each of the divided oxidant gas passageways 12 is communicatively connected to oxidant gas discharge outlets 12a and 12a each of which corresponds to power generation cells 5c and 5d and is opened on the separator surface corresponding to the center position thereof.

On the other hand, the fuel gas passageway 11 starts at the fuel gas hole 13 passing through inside separator arm 8b and an upper center position of the separator body 8c to reach a middle position P5 between the power generation cells 5b and 5c. Then, the fuel gas passageway 11 is divided at the middle position P5 horizontally into a T-shape. One of the divided fuel gas passageways 11 passes along the periphery of the power generation cell 5b, reaches a middle position P6 between the power generation cells 5a and 5b, and further is divided at the middle position P6 vertically into a T shape. Each of the divided fuel gas passageways 11 is communicatively connected to fuel gas discharge outlets 11a and 11a each of which corresponds to power generation cells 5a and 5b and is opened on the separator surface corresponding to the center position thereof.

The other one (right in the figure) of the fuel gas passageways 11 divided at the above middle position P5 into a T-shape passes along the periphery of the power generation cell 5c to reach a middle position P7 between the power generation cells 5c and 5d, and further is divided at the middle position P7 vertically into a T shape. Each of the divided fuel gas passageways 11 is communicatively connected to the fuel gas discharge outlets 11a and 11a each of which corresponds to the power generation cells 5c and 5d and is opened on the separator surface corresponding to the center position thereof.

Each time the fuel gas passageway 11 is divided at the above described positions P5, P6, and P7 of the separator body 8c, the sectional area thereof is reduced by about one-half accordingly.

Three gas outlet hole portions 31 penetrating in the thickness direction are formed in the center portion of the separator body 8c corresponding to the portion enclosed by the power generation cells 5a to 5d in such a manner to avoid the oxidant gas passageway 12. In addition, heat dissipating hole portions 32 each penetrating in the thickness direction are formed in a position between the power generation cell 5a and the power generation cell 5b and sandwiched between the branch portion P6 of the fuel gas passageway 11 and the branch portion P3 of the oxidant gas passageway 12; in a position between the power generation cell 5c and the power generation cell 5d and sandwiched between the branch portion P7 of the fuel gas passageway 11 and the branch portion P4 of the oxidant gas passageway 12; and in a position between the power generation cell 5b and the power generation cell 5c and sandwiched between the branch portion P5 of the fuel gas passageway 11 and the gas outlet hole portion 31 respectively.

As shown in FIGS. 1 and 2, a unit cell 10 configured as above is placed between the ring-shaped insulative gaskets 16 and 15, and they are laminated sequentially. Square-shaped upper clamping plate 20a and lower clamping plate 20b, which are larger than the separator 8, are provided at both upper and lower ends of the laminated body. Bolts 21 and nuts 26 are used to tighten the four positions on the peripheral portions thereof. The tightening load causes the individual gaskets 16 and 15 to be coupled in the lamination direction via the individual gas holes 14 and 13 of the separator 8. Then, two series of internal manifolds (oxidant gas manifold 18 and fuel gas manifold 17) having excellent gas sealing properties and extending in the lamination direction are formed inside the stack.

During operation, oxidant gases (air) and fuel gases are supplied from outside to the oxidant gas manifold 18 and the fuel gas manifold 17. The individual reactant gases flow from the oxidant gas hole 14 and the fuel gas hole 13 for each separator 8 passing through the oxidant gas passageway 12 and the fuel gas passageway 11 to be distributed and supplied to the oxidant electrode layer 4 and the fuel electrode layer 3 for each power generation cell 5, and then a power generation reaction occurs at the individual power generation cell 5.

The solid oxide fuel cell 1 uses a sealless structure without attaching a gas leak prevention seal to the periphery of the power generation cells 5, which allows gases (exhaust gases) remaining unconsumed by power generation reaction to be freely discharged outside from the peripheral portions of the individual power generation cells 5 during operation.

Hereinbefore, the solid oxide fuel cell 1 according to the first embodiment has a structure in which a plurality of power generation cells 5 are arranged in parallel on the same separator 8. In order to obtain the same output, this structure allows the diameter of a power generation cell 5 to be made smaller (for example, a diameter of 120 mm can be reduced to 60 mm) than the structure in which one power generation cell 5 is placed on one separator 8, thereby allowing the temperature distribution to be equalized and making the power generation cell 5 hard to be broken. In addition, the individual power generation cells 5 are connected in parallel and thus, even if one of the power generation cells 5 is broken, the other normal power generation cells 5 can be used, thereby allowing the operation to continue without an extreme decrease in output.

Further, oxidant gases (air) are introduced from the oxidant gas passageway 12 into the center portion of the separator 8 to obtain a cooling effect, which can suppress an increase in temperature in the center portion of the separator, thereby equalizing the temperature distribution in the separator surface and preventing the power generation cell 5 from being broken.

Since the fuel gases are smaller in flow volume than the oxidant gases, no cooling effect by the fuel gases can be obtained. However, as shown in FIG. 3, the heat dissipating hole portions 32 are provided in adjacent positions of the power generation cells 5, thereby promoting the heat dissipating effect on the adjacent portions of the separator 8 and contributing to the equalization of the temperature distribution in the separator surface.

In addition, the oxidant gas passageway 12 and the fuel gas passageway 11 are divided into a T shape so that the reactant gases can be distributed evenly at the branch portions and the total length of the individual gas flow channels can be made longer. This allows the reactant gases to be distributed evenly to the individual power generation cells and can improve power generation performance.

In particular, the fuel gas passageway 11 is configured to reduce the sectional area of the gas passageway for each branch portion toward the downstream side of the gas flow channel to cause pressure loss, thereby allowing the fuel gas passageway 11 to maintain a more reliable equal distribution of the fuel gases and providing a more stable power generation performance.

Further, the gas outlet hole portions 31 provided in the center portions of the separator 8 can prevent the reactant gases discharged from the outer periphery of the power generation cells 5a to 5d from remaining around the center portions of the separator. Therefore, the reactant gases can be efficiently discharged from the hole portions 31, and the oxidant gases and fuel gases can be efficiently supplied to the entire surfaces of the individual electrode layers, thereby improving power generation performance.

Figure 4:
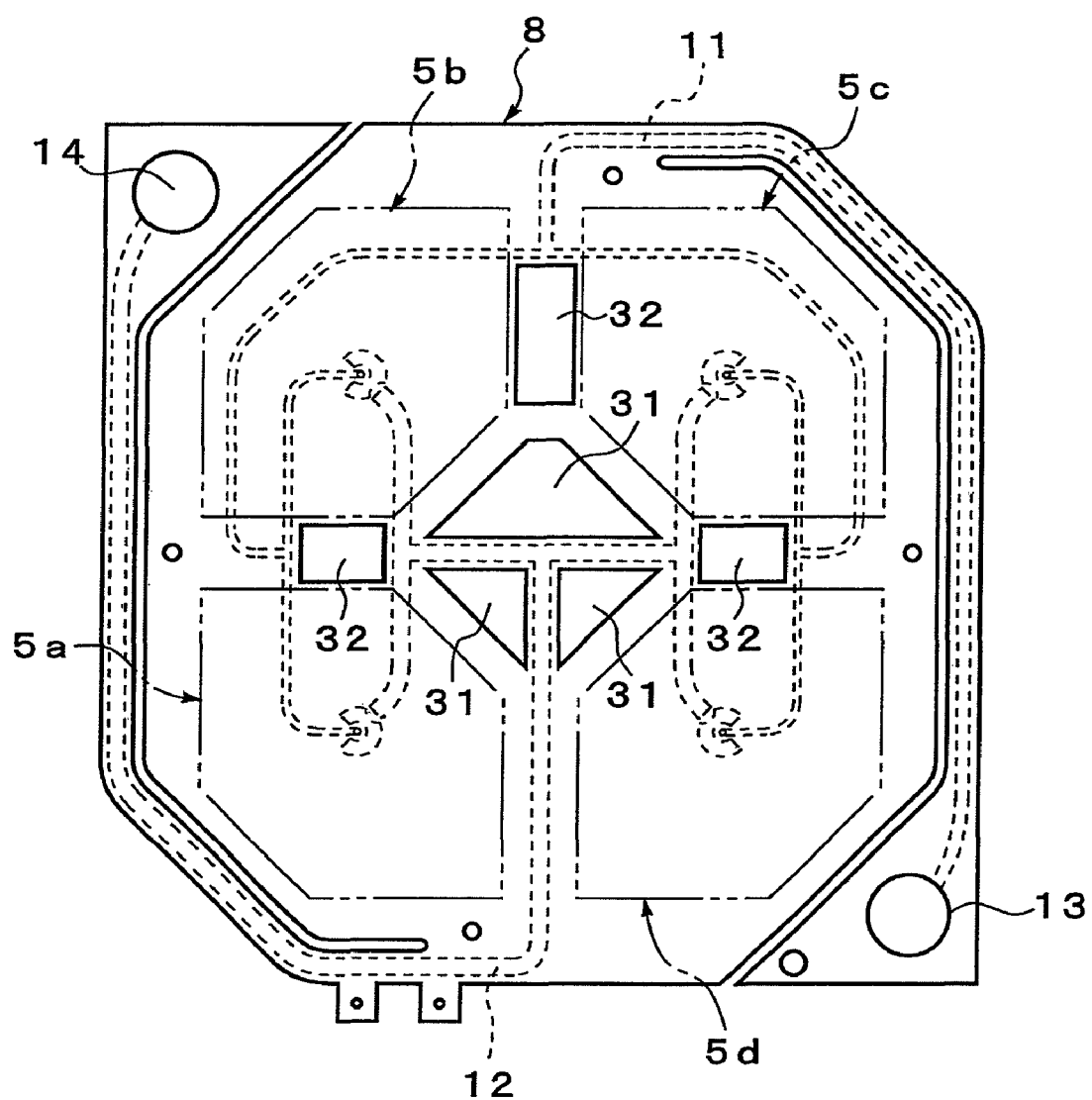
FIG. 4 is a drawing showing a structure of a separator different from the separator in FIG. 3.
Figure 5:
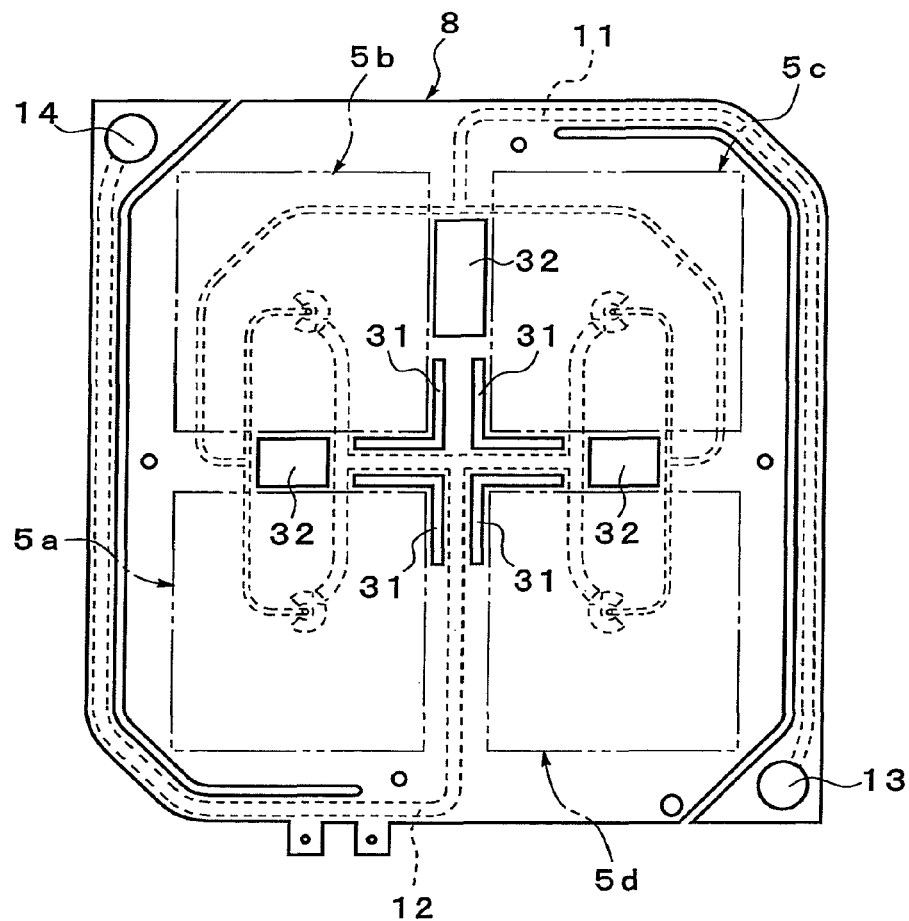
FIG. 5 is a drawing showing a structure of a separator different from the separator in FIG. 4.

Hereinbefore, according to the present embodiment, the shape of the power generation cell 5 is assumed to be circular, but other shapes may be used as the shape of the power generation cell 5 such as a hexagon as shown in FIG. 4 or a quadrangle as shown in FIG. 5.

It should be noted that in FIGS. 4 and 5, the same reference numerals or characters are assigned to the components common to FIG. 3 in such a manner as reference numeral 8 refers to a separator, reference characters 5a to 5d refer to power generation cells, reference numeral 11 refers to a fuel gas passageway, reference numeral 12 refers to an oxidant gas passageway, reference numeral 13 refers to a fuel gas hole, reference numeral 14 refers to an oxidant gas hole, reference numeral 31 refers to a gas outlet hole portion, and reference numeral 32 refers to a heat dissipating hole portion.

Next, in order to confirm the effect of the present invention, the following power generation tests were conducted.

First Example

A power generation test was conducted under the condition of an operating temperature of 750° C., a current density of 500 mA/cm$^2$, and a fuel utilization rate of 75% in such a manner as the cell shape and the number of power generation cells 5 provided on one separator 8 are varied to find an average power density of the power generation cells and the number of broken power generation cells. The findings are shown in Table 1. The above cell refers to a power generation cell 5 sandwiched between the separators 8. It should be noted that the amount of air supplied as the oxidant gas was five times the amount of hydrogen. A self-supported film type lanthanum gallate electrolyte LSGMC5 was used as the power generation cell 5. The thickness of the solid electrolyte layer 2 was 0.20 to 0.25 mm. A cermet of $Ce_{0.2}Sm_{0.8}O_2$ and Ni was used as the fuel electrode layer 3. $Sm_{0.5}Sr_{0.5}CoO_3$ was used as the oxidant electrode layer 4.

In the example 1-1 (conventional type), a circular flat plate-shaped cell with a diameter of 160 mm was laminated into five layers. 5 N ml/cm$^2$/min of hydrogen was supplied as the fuel gas. Here, N of the N ml refers to 0° C.

At this time, the average power density was 500 mW/cm$^2$ and a high performance was obtained. However, after a decrease to room temperature and when the stack was taken apart, three cells of the five cells were broken. It is assumed that this was caused by tensile stress induced by contraction occurring when an operating temperature of 750° C. decreased to room temperature.

These broken power generation cells 5 were placed again in the stack and a power generation test was conducted under the same conditions as before. Then, the average power density was found to be reduced to 0.18 W/cm$^2$. Accordingly, if some cells were broken in the stack, power generation performance was confirmed to be greatly reduced.

In the example 1-2 (conventional type), a circular cell of the conventional type with a diameter of 120 mm was laminated into five layers in the same manner as in the example 1-1. As a result, the average power density was found to be 0.51 W/cm$^2$ under the condition of a constant flow volume of the fuel gases and air per unit cell area. One cell of the five cells was found to be broken after the power generation test was conducted.

The broken cell was placed again in the stack and a power generation test was conducted under the same conditions as before. Then, the average power density was found to be reduced to 0.36 W/cm$^2$. In this case, the reduction rate was 29%.

Accordingly, even if only one cell thereof was broken in the stack, the power generation performance was rapidly reduced. This was because five cells were connected in series, and thus if one of the five cells was broken, resistance of that portion was greatly increased, thereby reducing the performance of the entire stack.

In the example 1-3, a circular cell with a diameter of 80 mm was provided and four power generation cells 5 were arranged in parallel on one separator 8 and they were laminated into five layers. As a result, the average power density under the same conditions was found to be 0.49 W/cm$^2$ indicating a reduction of 0.01 W/cm$^2$ in comparison with the example 1-1 using the conventional cells.

The reason for reduced performance is assumed to be that a reduced radius of the power generation cell 5 reduces the distance between the center portion of the cell and the outer peripheral, thereby reducing the frequency of an electrochemical reaction between hydrogen discharged from the center portion of the separator 8 and the fuel electrode layer 3.

One cell of the twenty cells was found to be broken after the power generation test was conducted. The broken cell was placed again in the stack and a power generation test was conducted under the same conditions as before. Then, the average power density was found to be 0.45 W/cm$^2$, the power reduction remained 0.04 W/cm$^2$, and the reduction rate remained 8%.

It should be noted that in the example 1-2 using conventional type cells, one broken cell caused the reduction rate of the average power density to be 29%. It was confirmed from this that even if a cell was broken, the separator structure in accordance with the first embodiment could reduce the performance reduction of the entire stack.

In the example 1-4, a circular cell with a diameter of 60 mm was provided and four power generation cells 5 were arranged in parallel on one separator 8 and they were laminated into five layers. In this case, the average power density under the same conditions was found to be 0.47 W/cm$^2$ indicating a reduction of 0.03 W/cm$^2$ in comparison with the example 1-1 using the conventional cells. The reason for reduced performance has been described as above.

No broken cell of the twenty cells was found after the power generation test was conducted. The same cells were placed again in the stack and a power generation test was conducted under the same conditions as before. Then, the average power density was found to be 0.47 W/cm$^2$, and no reduction of the power generation performance was found. It was confirmed that a reduced size of the power generation cell 5 allowed an increase in temperature, power generation, and a decrease in temperature in spite a high power output condition such as a current density of 650 mA/cm$^2$ without any cell broken.

These power generation cells 5 were replaced with unused cells respectively and comparative tests (2) and (3) were conducted to check for any broken cell. After a decrease in temperature, the cells were checked to confirm that there was no broken cell of the twenty cells. It was confirmed that, a reduced size of the power generation cell 5 was effective in preventing cells from being broken, and a parallel connection of the power generation cells 5 could maintain power generation performance thereof.

In the example 1-5, a circular cell with a diameter of 40 mm was provided, and in the example 1-6, a circular cell with a diameter of 30 mm was provided. In these examples, sixteen cells were arranged in parallel on one separator 8 and they were laminated into five layers.

In these cases, the average power density under the same conditions was found to be 0.45 W/cm$^2$ and 0.43 W/cm$^2$ respectively, and a reduced cell size tended to reduce power generation performance. After the tests were conducted, no broken cell of the eighty cells was found in the example 1-5 and the example 1-6. When comparative tests (2) and (3) were conducted to check for any broken cell after a decrease in temperature, no broken cell was found. It was confirmed again that a reduced size of the power generation cell 5 was effective in preventing cells from being broken. It is assumed that the examples 1-5 and 1-6 allow an increase in temperature, power generation, and a decrease in temperature in spite a high current density of 1 A/cm$^2$ or more without any broken cell.

In the example 1-7 (conventional type), the example 1-8, and the example 1-9, rectangular power generation cells were used and the number of cells on the separator 8 was varied and the total area of all the cells was made constant 500 cm$^2$. Under the above conditions, the power generation performance and the number of broken cells were checked after a decrease in temperature.

In the example 1-7 using conventional cells, all the five cells were found to be broken after the comparative test (1). After re-construction, the average power density was reduced to 0.08 W/cm$^2$. It is understood from this that a rectangular cell tends to be broken more often than a circular cell. It was confirmed that no broken cell was found after the comparative test (1) in the example 1-8 and the example 1-9 using a reduced size of cell.

In the example 1-10 (conventional type), the example 1-11, and the example 1-12, hexagonal power generation cells were used and the number of cells on the separator 8 was varied and the total area of all the cells was made constant 540 cm$^2$. Under the above conditions, the power generation performance and the number of broken cells were checked after a decrease in temperature.

In the example 1-10 using conventional cells, two cells were found to be broken after the comparative test (1), and, the average power density after re-construction was reduced to 0.23 W/cm$^2$. It is understood that a hexagonal cell is more difficult to be broken than the above described rectangular cell, but is easier to be broken than a circular cell.

In the example 1-11, after the comparative test (1), one cell was found to be broken, but no extreme reduction of power generation performance was found. If three cells of the four cells remain unbroken, the three cells can be used to electrochemically consume at least three-fourth of the fuel gas, thus allowing normal power generation with a fuel utilization rate of 75% or more. For example, assuming that the half of the area of the broken cell is available for power generation, normal power generation is assumed to be possible up to a fuel utilization rate of 87.5% at a rough estimate. On the other hand, in the example 1-10, one cell was found to be broken. Even if 50% of the broken cell is available for power generation, normal power generation is impossible with a fuel utilization rate of 50% or more.

Example 2

In the example 2, a comparative test was conducted on a gas supply channel inside the separator 8 to compare a case of supplying air to the center portion of the first embodiment (supplying air to the oxidant gas passageway 12 of the separator 8 and supplying a fuel gas to the fuel gas passageway 11 in FIG. 3) and a case of supplying a fuel gas to a gas supply passageway of the center portion of the separator 8 by replacing the fuel gas with air (that is, supplying a fuel gas to the oxidant gas passageway 12 and supplying air to the fuel gas passageway 11) and the results were shown in Table 2.

In the example 2-1, four circular cells with a diameter of 60 mm were arranged in parallel on one separator 8 and they were laminated into five layers. The average power density at this time was found to be 0.47 W/cm$^2$. In contrast to this, in the example 2-2 of a power generation test replacing the fuel channel with the air channel, the average power density was reduced to 0.43 W/cm$^2$.

In the example 2-2 where air was not supplied to the center portion of the separator, the temperature in the center portion of the separator was about 788° C., the temperature in the end portion was about 734° C., and the difference in temperature on the same separator was about 52° C. The reason for this is

TABLE 1

| Example | Cell shape | Size of power generation cell (diameter or side length) (mm) | Area of one cell (cm$^2$) | Number of cells on one separator | Effective power generation area on one separator (cm$^2$) | Number of laminated layers | Number of all cells | Effective area of all cells (cm$^2$) |
|---|---|---|---|---|---|---|---|---|
| 1-1 | Circular | 160 | 201 | 1 | 201 | 5 | 5 | 1005 |
| 1-2 | Circular | 120 | 113 | 1 | 113 | 5 | 5 | 565 |
| 1-3 | Circular | 80 | 50 | 4 | 201 | 5 | 20 | 1005 |
| 1-4 | Circular | 60 | 28 | 4 | 113 | 5 | 20 | 565 |
| 1-5 | Circular | 40 | 13 | 16 | 201 | 5 | 80 | 1005 |
| 1-6 | Circular | 30 | 7 | 16 | 113 | 5 | 80 | 565 |
| 1-7 | Rectangular | 100 | 100 | 1 | 100 | 5 | 5 | 500 |
| 1-8 | Rectangular | 50 | 25 | 4 | 100 | 5 | 20 | 500 |
| 1-9 | Rectangular | 25 | 6 | 16 | 100 | 5 | 80 | 500 |
| 1-10 | Hexagonal | 60 | 108 | 1 | 108 | 5 | 5 | 540 |
| 1-11 | Hexagonal | 30 | 27 | 4 | 108 | 5 | 20 | 540 |
| 1-12 | Hexagonal | 15 | 7 | 16 | 108 | 5 | 80 | 540 |

| Example | Amount of hydrogen supply (L) [(5 N ml · cm$^2$ · min$^{-1}$ constant] | Comparative test (1) average power density of power generation cell at 650 mA/cm$^2$ (fuel utilization rate of 75%) | Number of broken cells after comparative test (1) | Re-test after comparative test (1) average power density of power generation cell at 650 mA/cm$^2$ (fuel utilization rate of 75%) | Number of broken cells after comparative test (2) | Number of broken cells after comparative test (3) |
|---|---|---|---|---|---|---|
| 1-1 | 5.0 | 0.50 W/cm$^2$ | 3 | 0.18 W/cm$^2$ | 3 | 4 |
| 1-2 | 2.8 | 0.51 W/cm$^2$ | 1 | 0.36 W/cm$^2$ | 0 | 2 |
| 1-3 | 5.0 | 0.49 W/cm$^2$ | 1 | 0.45 W/cm$^2$ | 0 | 0 |
| 1-4 | 2.8 | 0.47 W/cm$^2$ | 0 | 0.47 W/cm$^2$ | 0 | 0 |
| 1-5 | 5.0 | 0.45 W/cm$^2$ | 0 | 0.44 W/cm$^2$ | 0 | 0 |
| 1-6 | 2.8 | 0.42 W/cm$^2$ | 0 | 0.42 W/cm$^2$ | 0 | 0 |
| 1-7 | 2.5 | 0.48 W/cm$^2$ | 5 | 0.08 W/cm$^2$ | 3 | 4 |
| 1-8 | 2.5 | 0.44 W/cm$^2$ | 0 | 0.44 W/cm$^2$ | 2 | 0 |
| 1-9 | 2.5 | 0.39 W/cm$^2$ | 0 | 0.38 W/cm$^2$ | 0 | 0 |
| 1-10 | 2.7 | 0.48 W/cm$^2$ | 2 | 0.23 W/cm$^2$ | 3 | 2 |
| 1-11 | 2.7 | 0.45 W/cm$^2$ | 1 | 0.40 W/cm$^2$ | 0 | 0 |
| 1-12 | 2.7 | 0.37 W/cm$^2$ | 0 | 0.36 W/cm$^2$ | 0 | 0 | considered that the fuel gas flow volume is one-fifth of the air flow volume, and thus the heat exchange amount in the center portion of the separator was reduced and the temperature was increased. In contrast to this, in the example 2-1 where air was supplied to the center portion of the separator, the difference in temperature was only about 12° C.

In the example 2-2, no cell was found to be broken in the comparative test (4) after a decrease in temperature, but in the comparative tests (5) and (6) in spite of using small cells of the twenty cells with a diameter of 60 mm, three cells were found to be broken in the comparative test (5) and one cell was found to be broken in the comparative test (6). Since the power generation performance when one or more cells were broken was reduced, a difference in temperature occurred inside the separator during power generation, which is considered to be a major cause of the broken cells.

Further, after the power generation test, no cell was found to be broken, but the average power density in the comparative test (4) was as low as 0.43 W/cm². The reason for this is considered that fuel gases were supplied to the oxidant gas passageway 12 where the channel width was not narrowed in the branch portion, and thus the uniform distribution of fuel gases was not maintained inside the separator.

In these power generation tests, four circular cells with a diameter of 60 mm were arranged in parallel on a separator and they were laminated into five layers. Further, air was supplied in the usual way from the oxidant gas passageway 12 of the separator 8.

In the example 3-1 where an outlet hole 31 was provided, the average power density was found to be 0.47 W/cm². In contrast to this, in the example 3-2 where an outlet hole 31 was not provided, the average power density was found to be 0.38 W/cm², indicating a decrease in power generation performance. It should be noted that in the example 3-1, the difference in temperature inside the same separator was about 12° C., but in the example 3-2, the difference in temperature was as high as about 31° C.

In the comparative test (7) and the comparative test (8), no cell was found to be broken in the example 3-2 after the comparative tests, but the power generation performance was low. The reason for this is assumed to be that in the case where an outlet hole 31 was not provided, water vapor produced by power generation reaction was not discharged from but remained in the center portion of the separator, thereby greatly decreasing electrochemical reaction in this portion. Therefore, it was confirmed that it was important to provide an outlet hole 31 in the center portion of the separator to improve power generation performance.

TABLE 2

| Example | Center portion | Comparative test (4) average power density of power generation cell at 650 mA/cm² (fuel utilization rate of 75%) | Temperature in center portion of separator | Temperature in end portion of separator | Difference in temperature on same separator | Number of broken cells of twenty cells after comparative test (4) | Comparative test (5) average power density of power generation cell at 650 mA/cm² (fuel utilization rate of 75%) | Number of broken cells of twenty cells after comparative test (5) | Comparative test (6) average power density of power generation cell at 650 mA/cm² (fuel utilization rate of 75%) | Number of broken cells of twenty cells after comparative test (6) |
| --- | --- | --- | --- | --- | --- | --- | --- | --- | --- | --- |
| 2-1 | Air supply | 0.47 W/cm² | 763° C. | 751° C. | 12° C. | 0 | 0.48 W/cm² | 0 | 0.47 W/cm² | 0 |
| 2-2 | Fuel supply | 0.43 W/cm² | 788° C. | 734° C. | 54° C. | 0 | 0.39 W/cm² | 3 | 0.42 W/cm² | 1 |

Example 3

In the example 3, the comparative test (7) and the comparative test (8) were conducted to check for the presence or absence of the gas outlet hole portion 31 in the center portion of the separator, and the results were shown in Table 3.

TABLE 3

| Example | Outlet hole in separator | Comparative test (7) average power density of power generation cell at 650 mA/cm² (fuel utilization rate of 75%) | Temperature in center portion of separator | Temperature in end portion of separator | Difference in temperature on same separator | Number of broken cells of twenty cells after comparative test (7) | Comparative test (8) average power density of power generation cell at 650 mA/cm² (fuel utilization rate of 75%) | Number of broken cells of twenty cells after comparative test (8) |
| --- | --- | --- | --- | --- | --- | --- | --- | --- |
| 3-1 | Present | 0.47 W/cm² | 763° C. | 751° C. | 12° C. | 0 | 0.46 W/cm² | 0 |
| 3-2 | Absent | 0.38 W/cm² | 775° C. | 744° C. | 31° C. | 0 | 0.38 W/cm² | 0 |

Example 4

In the example 4, four circular cells with a diameter of 60 mm were arranged in parallel on a separator 8 and they were laminated into five layers. In this structure, a power generation test was conducted by changing the type of solid electrolyte layer 2 of the power generation cell 5, and the results were shown in Table 4.

More specifically, in the example 4-1, a self-supported film type of lanthanum gallate with a thickness of about 0.2 mm was used as the solid electrolyte layer 2; in the example 4-2, zirconia 8YSZ with a thickness of 0.03 mm was used as the solid electrolyte layer 2; and in the example 4-3, ceria electrolyte ($CeO_2$) was used thereas.

In the example 4-1, the average power density was as high as 0.47 $W/cm^2$, but in the example 4-2, the average power density was as low as 0.20 $W/cm^2$.

The reason for this is assumed to be that in the example 4-2, Ni—$CeO_2$ cermet was used in the fuel electrode layer 3 as a support base thereof, lanthanum manganite ($LaMnO_3$) was used in the oxidant electrode layer 4; and the YSZ electrolyte had a lower ratio of the electronic conductivity to the ionic conductivity than the lanthanum gallate, and thus, the open circuit electromotive force was as high as 5.5 V, but for 750° C. in thin film electrolyte, enough ionic conductivity was not obtained, and hence the performance decreased.

In the example 4-2, one cell was found to be broken in the comparative test (10) of the three comparative tests, and as a whole, it was confirmed that there was less broken cell.

In the example 4-3, Ni—$CeO_2$ cermet was used as a support base thereof, and lanthanum manganite ($LaMnO_3$) was used in the oxidant electrode layer 4. The ceria electrolyte had a high ratio of the electronic conductivity to the ionic conductivity, and thus, the open circuit electromotive force was low due to internal short-circuit in the electrolyte portion. In addition, many cells were found to be broken after comparative tests. Therefore, it is considered that the use of ceria electrolyte requires further decreasing the cell size of a diameter of less than 60 mm.

Figure 6:
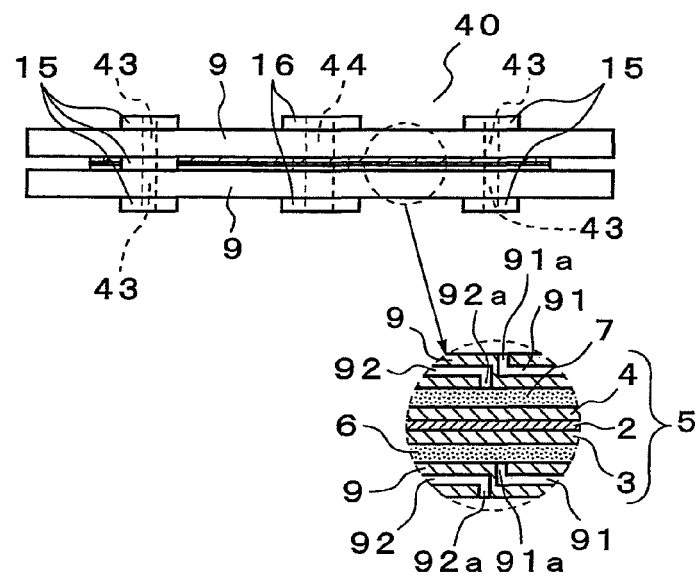
FIG. 6 is a partially enlarged view of a flat plate laminated type of solid oxide fuel cell in accordance with a second embodiment.

As shown in FIG. 6, a unit cell 40 includes a plurality of (four) power generation cells 5 having a solid electrolyte layer 2 sandwiched between a fuel electrode layer 3 and an oxidant electrode layer 4 on both surfaces thereof; a fuel electrode current collector 6 provided outside the individual fuel electrode layer 3; an air electrode current collector 7 provided outside the individual oxidant electrode layer 4; and upper and lower two separators 9 provided outside the current collectors 6 and 7.

Figure 7:
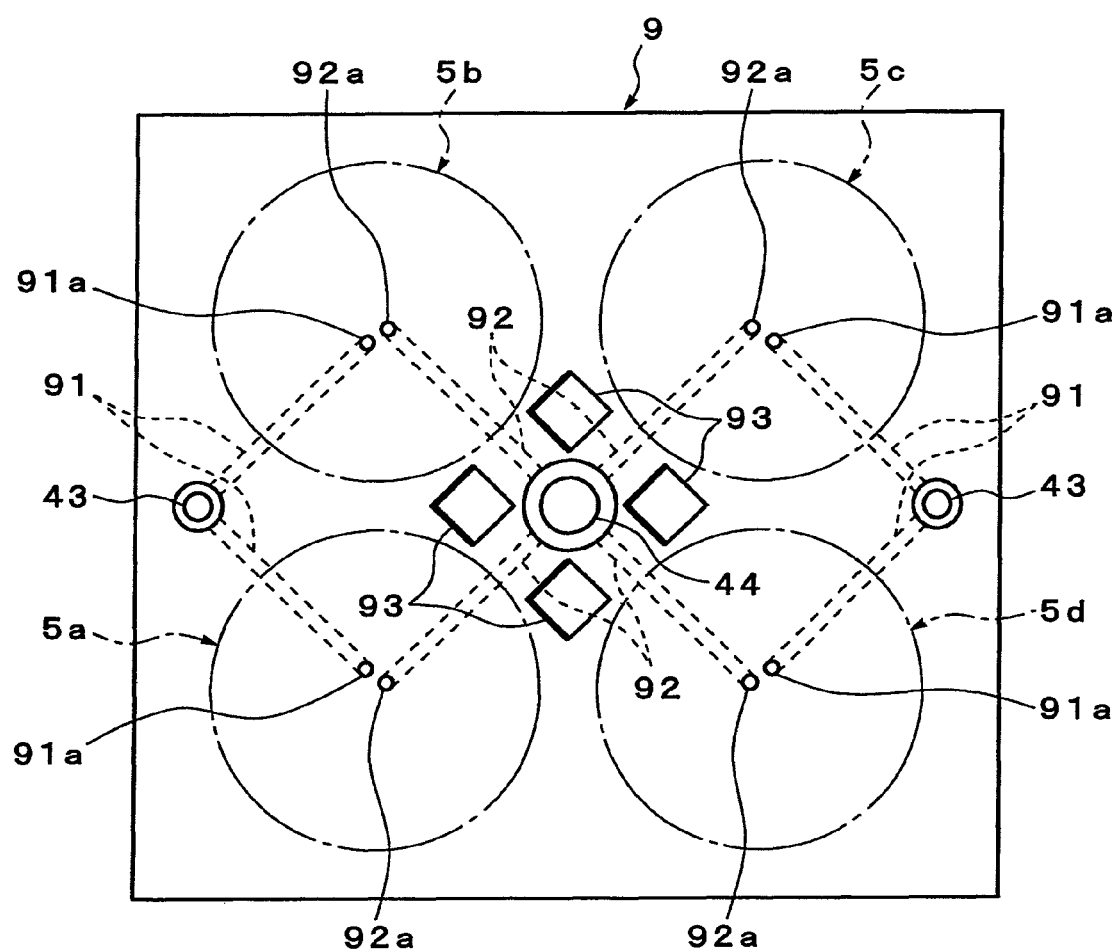
FIG. 7 is a drawing showing a structure of the separator in FIG. 6.

As shown in FIG. 7, the separator 9 is made of a square-shaped stainless-steel plate material with a thickness of several mm and is formed to have a size enough to cover the power generation cells 5a to 5d each having a small diameter of about 60 mm arranged up-down left-right symmetrically. The separator 9 has a function of electrically connecting the power generation cells 5a to 5d in parallel via common current collectors 6 and 7 as well as a function of supplying reactant gases to the individual power generation cells 5a to 5d, and has an oxidant gas passageway 92 and a fuel gas passageway 91 thereinside.

Further, the separator 9 includes an oxidant gas hole 44 penetrating through in the plate thickness direction, which is provided in the center portion corresponding to the position enclosed by a plurality of power generation cells 5a to 5d as well as a pair of fuel gas holes 43 each penetrating through in the plate thickness direction, which are provided so as to sandwich the oxidant gas hole 44 therebetween, in the outer peripheral portion corresponding to the outside of the plurality of power generation cells 5a to 5b, between the power generation cells 5a and 5b and between the power generation cells 5c and 5d.

The oxidant gas hole 44 is communicatively connected to four linear oxidant gas passageways 92 each extending in a direction of a corner portion of the separator 9. The individual oxidant gas passageway 92 is configured to discharge an oxidant gas to the oxidant electrode layer 4 of the individual power generation cell 5 from a terminal gas outlet 92a opened in a position corresponding to the center portion of the individual power generation cell 5.

TABLE 4

| Example | Power generation cell | Open circuit voltage (V) | Comparative test (9) average power density of power generation cell at 650 $mA/cm^2$ (fuel utilization rate of 75%) | Number of broken cells of twenty cells after comparative test (9) | Number of broken cells of twenty cells after comparative test (10) | Number of broken cells of twenty cells after comparative test (11) |
|---|---|---|---|---|---|---|
| 4-1 | Self-supported film lanthanum gallate (LSGMC5) | 5.1 | 0.47 $W/cm^2$ | 0 | 0 | 0 |
| 4-2 | Support film zirconia (8YSZ) | 5.5 | 0.20 $W/cm^2$ | 0 | 1 | 0 |
| 4-3 | Support film ceria (CeO2) | 4.4 | 0.13 $W/cm^2$ | 5 | 8 | 6 |

Second Embodiment

Hereinafter, the solid oxide fuel cell in accordance with the second embodiment will be described with reference to FIGS. 6 and 7.

It should be noted that the same reference numerals or characters are assigned to the components having the same configuration as for the first embodiment, and the description thereof is omitted.

On the other hand, the individual fuel gas hole 43 is communicatively connected to two linear fuel gas passageways 91 extending toward the center portion of the individual power generation cell 5. The individual fuel gas passageway 91 is configured to discharge a fuel gas to the center portion of the fuel electrode layer 3 of the individual power generation cell 5 from the terminal gas outlet 91a.

Further, four gas outlet hole portions 93 each penetrating in the thickness direction are formed between the oxidant gas passageways 92 in the circumference of the oxidant gas hole 44 in the center portion of the separator 9 corresponding to the portion enclosed by the power generation cells 5a to 5d in such a manner to avoid the individual oxidant gas passageways 92.

In the same manner as in the first embodiment, a unit cell 40 configured as above is placed between the ring-shaped insulative gaskets 16 and 15, and they are laminated sequentially. Square-shaped upper clamping plate 20a and lower clamping plate 20b, which are larger than the separator 9, are provided at both upper and lower ends of the laminated body. Bolts 21 and nuts 26 are used to tighten the four positions on the peripheral portions thereof. The tightening load causes the individual gaskets 16 and 15 to be coupled in the lamination direction via the individual gas holes 44 and 43 of the separator 9. Then, two series of internal manifolds (oxidant gas manifold and fuel gas manifold) having excellent gas sealing properties and extending in the lamination direction are formed inside the stack.

During operation, oxidant gases (air) and fuel gases are supplied from outside and flow to the oxidant gas manifold and the fuel gas manifold. The individual reactant gases flow from the oxidant gas hole 44 and the fuel gas hole 43 on the individual separator 9 passing through the oxidant gas passageway 92 and the fuel gas passageway 91 to be distributed and supplied to the oxidant electrode layer 4 and the fuel electrode layer 3 on the individual power generation cell 5, and then a power generation reaction occurs at the individual power generation cell 5.

The solid oxide fuel cell in accordance with the second embodiment also uses a sealless structure without attaching a gas leak prevention seal to the periphery of the power generation cells 5, which allows gases (exhaust gases) remaining unconsumed by power generation reaction to be freely discharged outside from the peripheral portions of the individual power generation cells 5 during operation.

Third Embodiment

Figure 8:
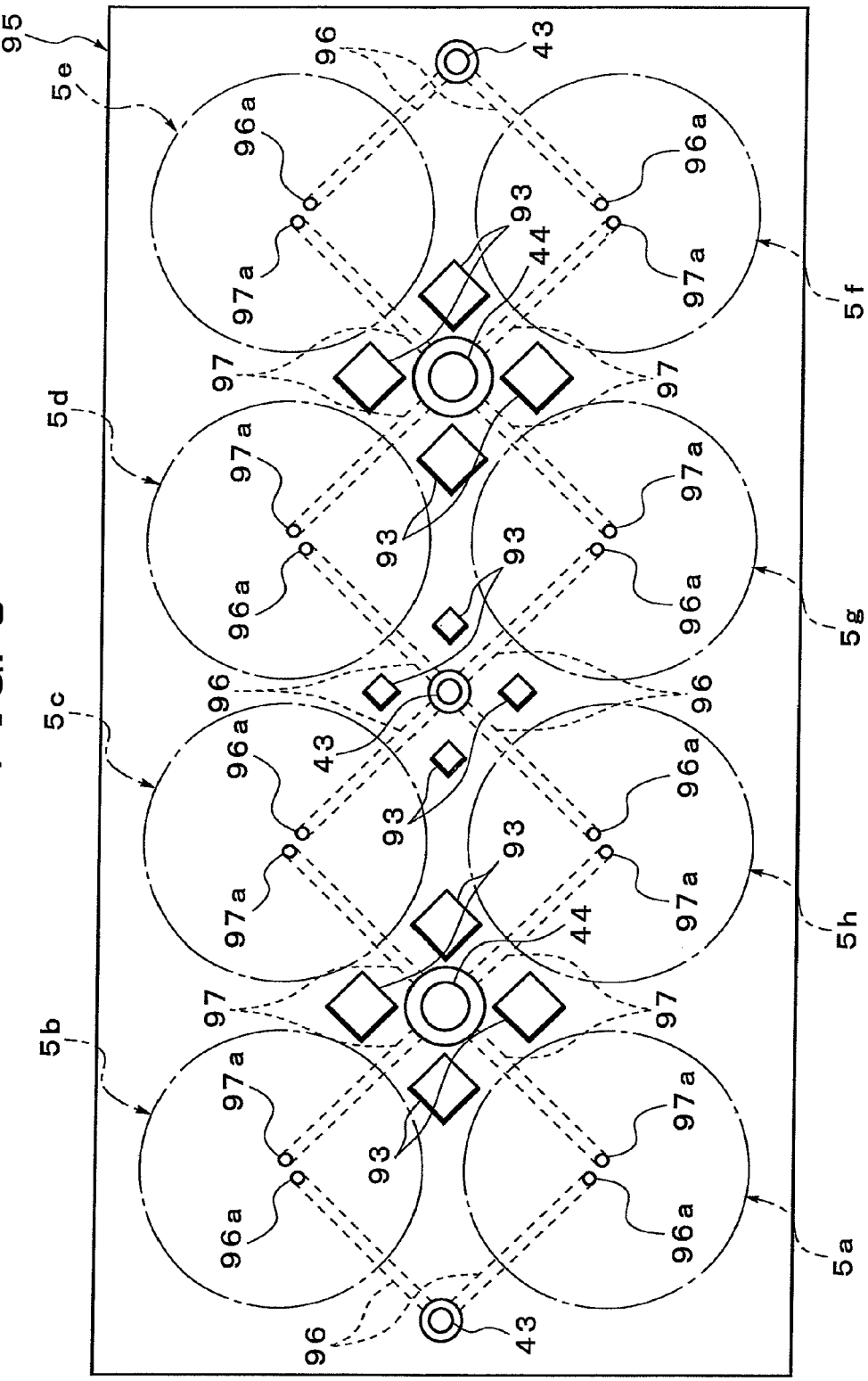
FIG. 8 is a drawing showing a structure of a separator of a flat plate laminated type of solid oxide fuel cell in accordance with a third embodiment.

Hereinafter, the solid oxide fuel cell in accordance with the third embodiment will be described with reference to FIG. 8.

It should be noted that the same reference numerals or characters are assigned to the components having the same configuration as for the second embodiment, and the description thereof is omitted.

In the same manner as in the second embodiment, a unit cell includes a plurality of power generation cells 5 having a solid electrolyte layer 2 sandwiched between a fuel electrode layer 3 and an oxidant electrode layer 4 on both surfaces thereof; a fuel electrode current collector 6 provided outside the individual fuel electrode layer 3; an air electrode current collector 7 provided outside the individual oxidant electrode layer 4; and upper and lower two separators 95 provided outside the current collectors 6 and 7. Here, as shown in FIG. 8, the power generation cells 5 are provided such that a total of eight power generation cells are arranged so as to form a plurality of (two) lines in the vertical direction and even number of (four) columns in the horizontal direction.

The separator 95 is made of a rectangular stainless-steel plate material with a thickness of several mm and is formed to have a size enough to cover the power generation cells 5a to 5h each having a small diameter of about 60 mm. The separator 95 has a function of electrically connecting the power generation cells 5a to 5h in parallel via common current collectors 6 and 7 as well as a function of supplying reactant gases to the individual power generation cells 5a to 5h, and has an oxidant gas passageway 97 and a fuel gas passageway 96 thereinside.

Further, in order to provide all the oxidant gas holes 44 in the center portion corresponding to the position enclosed by a plurality of power generation cells 5a to 5h, the separator 95 has a pair of fuel gas holes 43 each penetrating through in the plate thickness direction, which are provided in the outer peripheral portions corresponding to the outside of the plurality of power generation cells 5a to 5b, between the power generation cells 5a and 5b and between the power generation cells 5e and 5f.

More specifically, the oxidant gas holes 44 each penetrating through in the plate thickness direction are provided on the separator 95 such that one is provided in a position facing the fuel gas hole 43 with respect to the power generation cells 5a and 5b and corresponding to the portion enclosed by the power generation cells 5a, 5b, 5c, and 5h; and the other one is provided in a position facing the fuel gas hole 43 with respect to the power generation cell 5e and 5f and corresponding to the portion enclosed by the power generation cells 5d, 5e, 5f, and 5g.

In addition, another fuel gas hole 43 penetrating through in the plate thickness direction is provided on the separator 95 in a position facing the oxidant gas hole 44 with respect to the power generation cells 5c and 5h, also facing the oxidant gas hole 44 with respect to the power generation cells 5d and 5g and corresponding to the portion enclosed by the power generation cells 5c, 5h, 5d, and 5g.

The individual oxidant gas hole 44 is communicatively connected to four linear oxidant gas passageways 97 each extending in a direction of the center portion of the individual power generation cell 5. The individual oxidant gas passageway 97 is configured to discharge an oxidant gas to the center portion of the oxidant electrode layer 4 of the individual power generation cell 5 from a terminal gas outlet 97a. Likewise, the individual fuel gas hole 43 is communicatively connected to four linear fuel gas passageways 96 each extending in a direction of the center portion of the individual power generation cell 5. The individual fuel gas passageway 96 is configured to discharge a fuel gas to the center portion of the fuel electrode layer 3 of the individual power generation cell from the terminal gas outlet 96a.

However, the pair of fuel gas holes 43 provided in positions corresponding to between the power generation cells 5a and 5b on the separator 95 and between the power generation cells 5e and 5f thereon are also communicatively connected to two linear fuel gas passageways 96 each extending toward the center portion of the individual power generation cell 5. These fuel gas passageways 96 are also configured to discharge a fuel gas to the center portion of the fuel electrode layer 3 of the individual power generation cell 5 from the terminal gas outlet 96a.

Further, four gas outlet hole portions 93 each penetrating in the thickness direction are formed between the oxidant gas passageways 97 in the circumference of the individual oxidant gas hole 44 in the center portion of the separator 95 corresponding to the portion enclosed by the power generation cells 5a to 5h in such a manner to avoid the oxidant gas passageway 97, and a total of eight gas outlet hole portions 93 are formed. In addition, four gas outlet hole portions 93 each penetrating in the thickness direction are formed between the fuel gas passageways 96 in the circumference of the oxidant gas hole 44 in such a manner to avoid the fuel gas passageway 96.

In the same manner as in the second embodiment, a unit cell configured as above is placed between the ring-shaped insulative gaskets 16 and 15, and they are laminated sequentially. Square-shaped upper clamping plate 20a and lower clamping plate 20b, which are larger than the separator 95, are provided at both upper and lower ends of the laminated body. Bolts 21 and nuts 26 are used to tighten the four positions on the peripheral portions thereof. The tightening load causes the individual gaskets 16 and 15 to be coupled in the lamination direction via the individual gas holes 44 and 43 of the separator 95. Then, two series of internal manifolds (oxidant gas manifold and fuel gas manifold) having excellent gas sealing properties and extending in the lamination direction are formed inside the stack.

During operation, oxidant gases (air) and fuel gases are supplied from outside and flow to the oxidant gas manifold and the fuel gas manifold. The individual reactant gases flow from the oxidant gas hole 44 and the fuel gas hole 43 on the individual separator 95 passing through the oxidant gas passageway 97 and the fuel gas passageway 96 to be distributed and supplied to the oxidant electrode layer 4 and the fuel electrode layer 3 on the individual power generation cell 5, and then a power generation reaction occurs at the individual power generation cell 5.

Further, the solid oxide fuel cell in accordance with the third embodiment also uses a sealless structure without attaching a gas leak prevention seal to the periphery of the power generation cells 5.

It should be noted that according to the second embodiment and third embodiment, the power generation cells 5 are circular, but the power generation cells 5 may be quadrangular or hexagonal like the first embodiment.

Hereinbefore, like the first embodiment, the solid oxide fuel cell 1 in accordance with the second embodiment and the third embodiment also uses a structure in which a plurality of power generation cells 5 are arranged in parallel on the same separator 9 or 95. This structure allows the same power to be obtained by a smaller diameter of power generation cell 5 than that of the structure in which one power generation cell 5 is provided on the separator 9 or 95 (for example, the diameter thereof can decrease from 120 mm to 60 mm). The smaller the diameter of the cell, the more uniform temperature distribution can be achieved, and the more difficult the power generation cell 5 is to be broken. In addition, since the individual power generation cells 5 are connected in parallel, even if one of the plurality of power generation cells 5 is broken, power can be extracted from the other normal power generation cells 5, the operation can continue without an extreme power decrease.

Further, oxidant gases (air) are introduced from the oxidant gas passageway 92 or 97 into the center portion of the separator 9 or 95 to obtain the cooling effect, which can suppress an increase in temperature in the center portion of the separator, thereby equalizing the temperature distribution in the separator surface and preventing the power generation cell 5 from being broken.

Further, according to the solid oxide fuel cell in accordance with the second embodiment and the third embodiment, an oxidant gas manifold is formed by the oxidant gas holes 44 provided in the center portion corresponding to the position enclosed by a plurality of power generation cells 5a to 5d and 5a to 5h on the separator 9 or 95, and thus oxidant gases are supplied directly to the oxidant gas passageways 92 or 97 on the separator 9 through the oxidant gas holes 44 from the oxidant gas manifold, thereby efficiently suppressing the temperature in the center portion of the separator from increasing. Further, the total length of the oxidant gas passageways 92 or 97 on the separator 9 or 95 can be shortened to simplify the structure of the separator 9 or 95, thereby allowing the entire fuel cell to be made smaller.

Further, according to the solid oxide fuel cell in accordance with the second embodiment and the third embodiment, the gas outlet hole portions 93 provided in the center portions of the separator 9 or 95 can prevent the reactant gases discharged from the outer periphery of the power generation cells 5a to 5d from remaining around the center portions of the separator. Therefore, the reactant gases can be efficiently discharged from the hole portions 93, and the oxidant gases and fuel gases can be efficiently supplied to the entire surfaces of the individual electrode layers, thereby improving power generation performance.

Fourth Embodiment

The fourth embodiment corresponds to the second aspect of the present invention.

Hereinafter, with reference to FIGS. 9 to 11, the fourth embodiment of the fuel cell stack in accordance with the present invention will be described.

Figure 9:
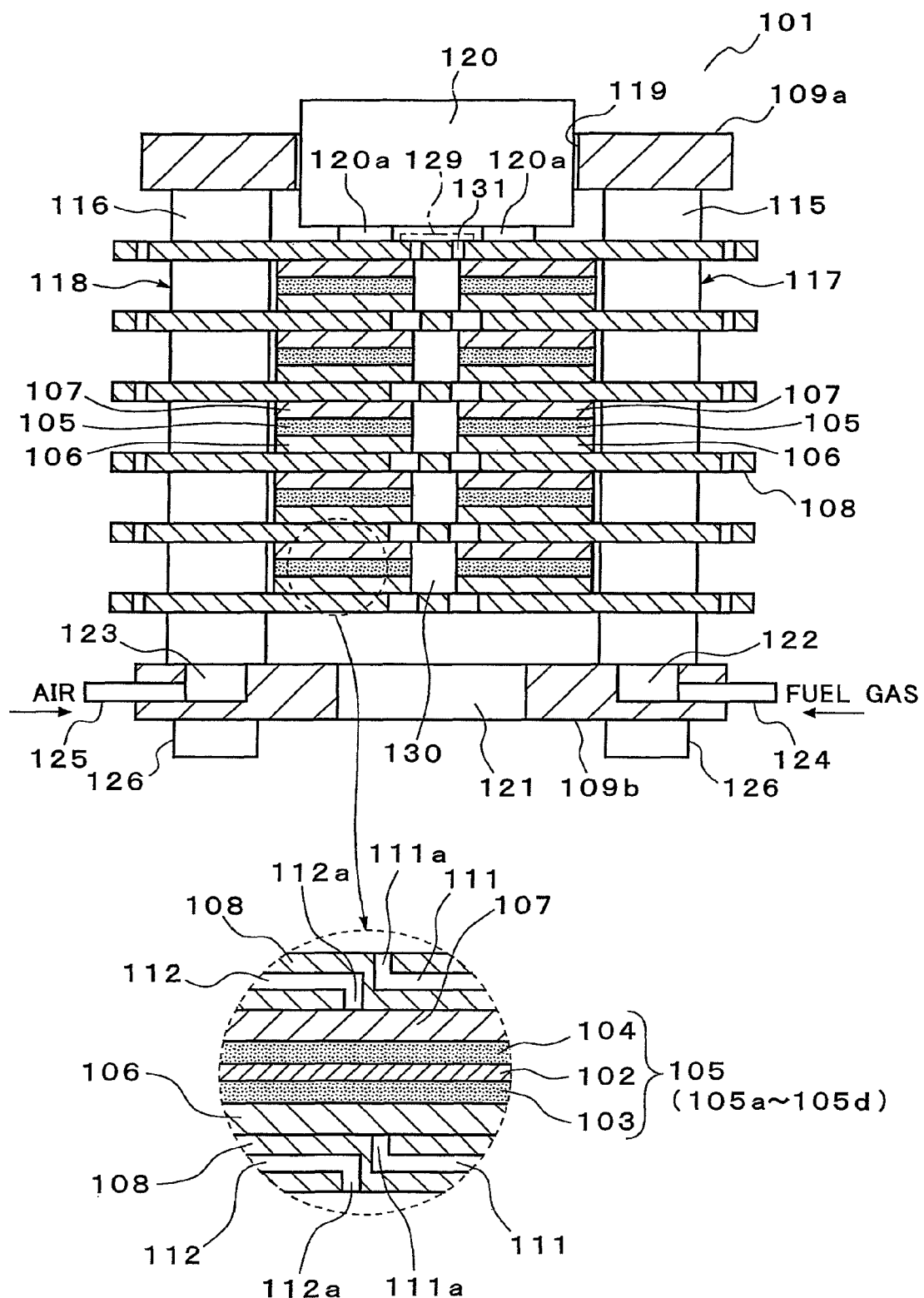
FIG. 9 is a schematic view showing an internal structure of a solid oxide fuel cell stack in accordance with a fourth embodiment.

FIG. 9 is a schematic view showing an internal structure of the solid oxide fuel cell stack in accordance with the present embodiment. FIG. 10 is a top view of the lower end plate. FIG. 11 is a drawing showing a structure of the separator.

As shown in the enlarged view of the essential parts of FIG. 9, the solid oxide fuel cell stack in accordance with the present embodiment has a structure in which a plurality of power generation cells 105 (105a to 105d) having a solid electrolyte layer 102 sandwiched between a fuel electrode layer 103 and an air electrode layer 104 on both surfaces thereof; a fuel electrode current collector 106 provided outside the fuel electrode layer 103; an air electrode current collector 107 provided outside the air electrode layer 104; and separator 108 provided outside the individual current collectors 106 and 107, are laminated into many layers in the vertical direction in that order.

Of the components of the above laminated body (stack), the solid electrolyte layer 102 is made of yttria-stabilized zirconia (YSZ) or the like; the fuel electrode layer 103 is made of a metal such as Ni or a cermet such as Ni—YSZ; the air electrode layer 104 is made of $LaMnO_3$, $LaCoO_3$, or the like; the fuel electrode current collector 106 is made of a sponge-like porous sintered metal plate such as Ni; and the air electrode current collector 107 is made of a sponge-like porous sintered metal plate such as Ag.

Figure 11:
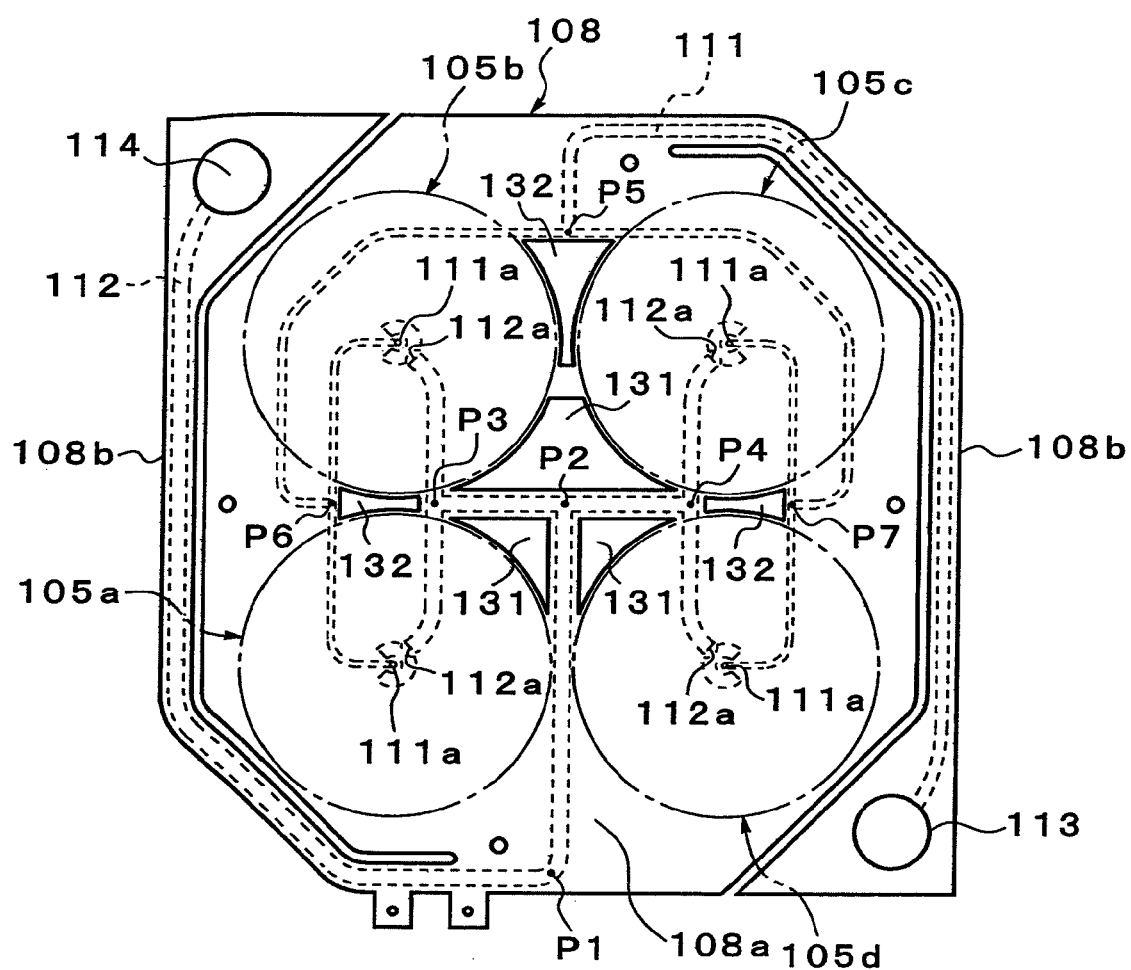
FIG. 11 is a drawing showing a structure of the separator in FIG. 9.
Figure 12:
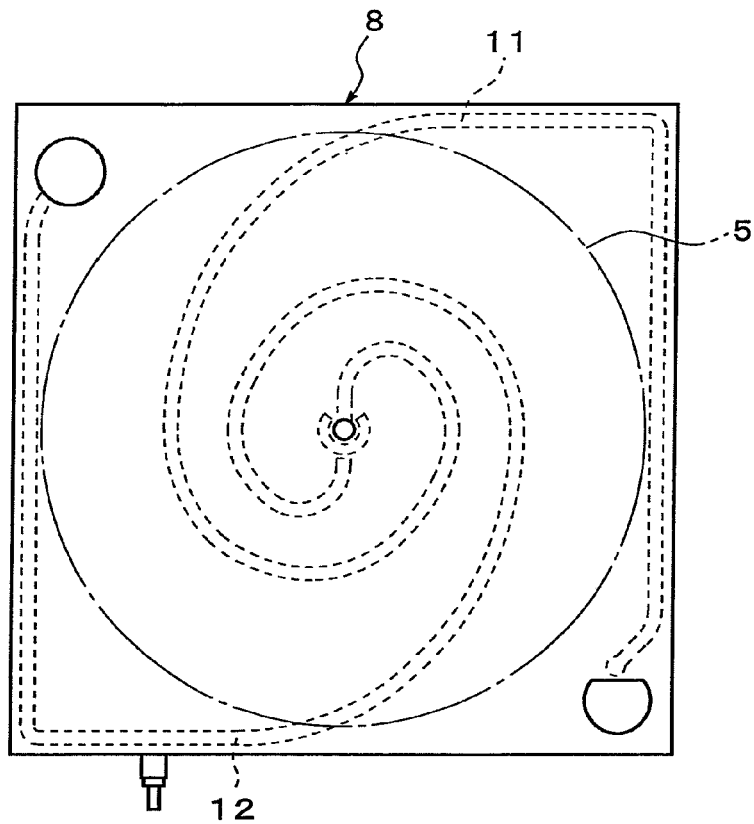
FIG. 12 is a drawing showing a structure of a separator shown as a conventional example.

As shown in FIG. 11, the separator 108 is made of a substantially square-shaped stainless-steel plate with a thickness of several mm and includes a separator body 108a having a plurality of power generation cells 105 described above and current collectors 106 and 107 outside the individual power generation cell 105 thereon; and arm sections 108b and 108b which extend in the plane direction from the separator body 108a and support the mutually facing edge portions of the separator body 108a at two positions.

According to the present embodiment, as shown by the one-dot chain line in FIG. 11, the four power generation cells 105a to 105d circular in plan view are arranged up-down left-right symmetrically on the same plane in the center portion of the separator body 108a.

The separator 108 electrically connects in parallel the power generation cells 105a to 105d arranged on the same plane via the current collectors 106 and 107 as well as serially connects the parallel connected power generation cell group (105a to 105d) in the lamination direction.

Further, the separator 108 has a function of supplying air and fuel gases as the reactant gases to the individual power generation cells 105a to 105d. A fuel gas channel 111 for passing fuel gases and an air channel 112 for passing air are formed inside the separator 108. Further, each of the arm sections 108b and 108b has a fuel feed port 113 and an air feed port 114 on the end portions thereof each penetrating in the thickness direction and facing each other. The fuel feed port 113 is communicatively connected to the above fuel gas channel 111, the air feed port 114 is communicatively connected to the above air channel 112.

More specifically, as shown in FIG. 11, the above air channel 112 starts at the air feed port 114 passing through inside one of the arm sections 108b and reaches a lower center position P1 of the separator 108. Then, the air channel 112 turns at the position P1 toward inside the separator 108 and reaches a center position P2 of the separator body 108a enclosed by the power generation cells 105a to 105d. Then, the air channel 112 is divided horizontally into a T-shape at the position P2. One (left) of the divided air passageways 112 reaches a middle position P3 between the power generation cell 105a and the power generation cell 105b and further is divided vertically into a T shape at position P3. Each of the divided air passageways 112 is communicatively connected to air discharge outlets 112a and 112a each of which corresponds to the center position of the power generation cells 105a and 105b and is opened on the separator surface.

The other one (right) of the air passageways 112 divided at the position P2 reaches a middle position P4 between the power generation cell 105c and the power generation cell 105d and further is divided vertically into a T shape at the position P4. Each of the divided air passageways 112 is communicatively connected to the air discharge outlets 112a and 112a each of which corresponds to the center position of the power generation cells 105c and 105d and is opened on the separator surface.

On the other hand, the fuel gas channel 111 starts at the fuel feed port 113 passing through inside the arm section 108b different from the above one and reaches, from the upper center of the separator 108, a middle position P5 between the power generation cell 105c and the power generation cell 105d. Then, the fuel gas channel 111 is divided horizontally into a T-shape at the middle position P5. One (left) of the fuel gas passageways 111 passes along the periphery of the power generation cell 105b, reaches a middle position P6 between the power generation cell 105a and the power generation cell 105b, and further is divided vertically into a T shape at the middle position P6. Each of the divided fuel gas passageways 111 is communicatively connected to the fuel gas discharge outlets 111a and 111a each of which corresponds to the center portion of the power generation cells 105a and 105b and is opened on the separator surface.

The other one (right) of the fuel gas passageways 111 divided into a T-shape at the above middle position P5 passes along the periphery of the power generation cell 105c and reaches a middle position P7 between the power generation cells 105c and 105d, and further is divided horizontally into a T shape at the middle position P7. Each of the divided fuel gas passageways 111 is communicatively connected to the fuel gas discharge outlets 111a and 111a each of which corresponds to the center portion of the power generation cells 105c and 105d and is opened on the separator surface.

Each time the fuel gas channel 111 is divided at the above described positions P5, P6, and P7 of the separator body 108a, the sectional area thereof is reduced accordingly, thereby assuring uniform distribution of fuel gases to the individual power generation cells 105a to 105d.

Further, elongated hole portions 132 each penetrating in the thickness direction are formed: one is provided between the power generation cell 105a and the power generation cell 105b and in a position sandwiched between the branch portion P6 of the fuel gas channel 111 and the branch portion P3 of the air channel 112; and the other one is provided between the power generation cell 105c and the power generation cell 105d and in a position sandwiched between the branch portion P5 of the fuel gas channel 111 and the gas outlet hole 131. These hole portions 132 have an effect on improving heat dissipating properties of the separator adjacent portions and thus can reduce the temperature distribution inside the separator surface.

What deserves special mention about the separator 108 of the present embodiment is that gas outlet holes 131 penetrating in the thickness direction for discharging exhaust gases are formed in the center portion of the individual separator 108 corresponding to the position enclosed by the power generation cells 105a to 105d. As the gas outlet holes 131, a total of three trapezoidal, triangular through-holes are formed so as to enclose the air channel 112 in the center portion of the separator body 108a. When many separators 108 having these gas outlet holes 131 are laminated as shown in FIG. 9, an exhaust gas flow channel 130 vertically penetrating through the center portion of the stack is formed.

According to the present embodiment, the size (total area of the above described three through-holes) of the gas outlet hole 131 of a separator 108 located at the upper end portion of the stack is set to be smaller than the size of the gas outlet hole 131 of other separator 108 located at the lower portion of the stack.

As shown in FIG. 9, a stainless-steel upper end plate 109a and a lower end plate 109b are arranged at the upper and lower ends of the stack via the insulative manifold rings 115 and 116. These upper and lower end plates 109a and 109b are used to tighten the stack in the lamination direction.

A round hole 119 is provided in the center portion of the upper end plate 109a. Through this round hole 119, a cylindrical plummet 120 is placed on the upper surface of the separator 108 at the upper end of the stack. The stack is pressed downward by the load of the plummet 120 so that the individual components (power generation cells 105, current collectors 106 and 107, and separators 108) are closely appressed to each other and are integrally fixed.

Support legs 120a are provided on the bottom portion of the plummet 120 so that a space portion is created between the lower surface of the plummet 120 and the upper surface of the separator 108. Therefore, the exhaust gases going upward inside the above exhaust gas flow channel 130 are vented to the space portion from the gas outlet hole 131 of the separator 108 at the upper end of the stack (at the upper end portion of the exhaust gas flow channel 130), flowing through the space portion, and then are discharged outward at the side of the fuel cell stack 101.

Further, a tubular fuel gas manifold 117 and an air manifold 118 are vertically installed at the mutually facing edge portions of the stack. These manifolds 117 and 118 include manifold rings 115 and 116 provided between the individual separators 108 so as to couple the fuel feed port 113 and the air feed port 114 of the separator 108 with each other between top and bottom. In the stack, the fuel gas manifold 117 is communicatively connected to the fuel gas channel 111 via the fuel feed port 113 of the individual separators 108; and the air manifold 118 is communicatively connected to the air channel 112 via the air feed port 114 of the individual separators 108.

Figure 10:
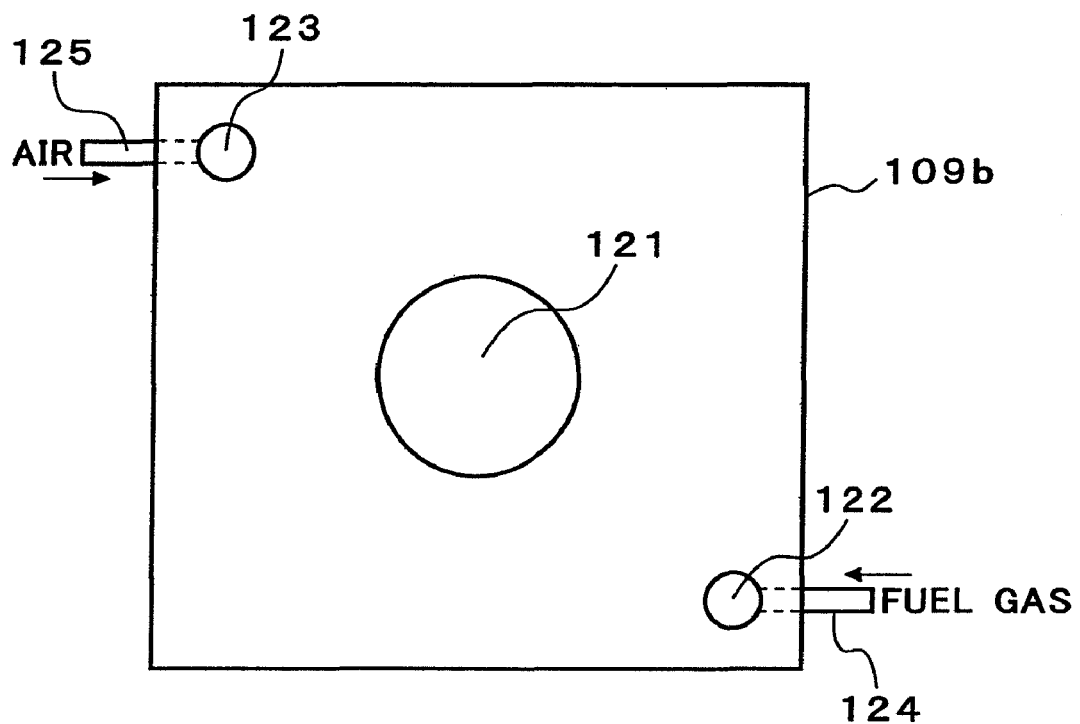
FIG. 10 is a top view of the lower end plate in FIG. 9.

As shown in FIGS. 9 and 10, an air pipe 125 for introducing air from outside is provided near the lower end of the air manifold 118, namely, one side portion of the lower end plate 109b; and a fuel gas pipe 124 for introducing a fuel gas from outside is provided near the lower end of the fuel gas manifold 117, namely, the other side portion of the lower end plate 109b. The air pipe 125 is communicatively connected to the lower end portion of the air manifold 118 via an air passageway 123 formed in the lower end plate 109b; and the fuel gas pipe 124 is communicatively connected to the lower end portion of the fuel gas manifold 117 via a fuel passageway 122 formed in the lower end plate 109b.

Further, a gas outlet 121 is provided in the center portion of the lower end plate 109b for discharging, outside the stack, the exhaust gases flowing downward inside the exhaust gas flow channel 130. A support leg portion 126 is provided on the lower surface of the lower end plate 109b so that a space capable of flowing exhaust gases discharged from the gas outlet 121 is secured between the lower end plate 109b and an installation surface (not shown).

According to the fuel cell stack 101 configured as above, during operation, air and fuel gases provided from outside flow into the air manifold 118 and the fuel gas manifold 117 via the air pipe 125 and the fuel gas pipe 124. These reactant gases flow starting at the feed ports 113 and 114 of the individual separator 108, passing through the fuel gas channel 111 and the air channel 112, reaching the terminal fuel outlet 111a and the air outlet 112a where the reactant gases are discharged to the fuel electrode current collector 106 side and the air electrode current collector 107 side. Then, the reactant gases diffuse and move inside the current collectors so as to be introduced into the individual electrode surfaces (fuel electrode layer 103 and air electrode layer 104) of the individual power generation cells 105 where power generation reaction occurs.

The power generation reaction generates Joule heat in the individual power generation cells 105, and the thermal energy is discharged outside through the individual separators 108. The power generation cell 105 uses a sealless structure without attaching a gas leak prevention seal to the periphery thereof, which allows gases (exhaust gases) remaining unconsumed by power generation reaction to be discharged outside from the peripheral portions of the individual power generation cells 105.

Therefore, in the center portion of the separator 108 enclosed by a plurality of power generation cells 105a to 105d, the exhaust gases discharged from the side portions of the individual power generation cells 105a to 105d flow into the exhaust gas flow channel 130 through the gas outlet hole 131 of the individual separators 108 and then flow vertically inside the exhaust gas flow channel 130.

The exhaust gases flowing upward inside the exhaust gas flow channel 130 are discharged from the gas outlet hole 131 of the uppermost separator 108 at the upper end portion of the exhaust gas flow channel 130. Then, the exhaust gases flow through the space portion between the upper surface of the separator 108 and the lower surface of the plummet 120, and are discharged outside the stack. On the other hand, the exhaust gases flowing downward are discharged from the gas outlet hole 131 of the lowermost separator 108 at the lower end portion of the exhaust gas flow channel 130. Then, the exhaust gases are discharged outside the stack mainly through the gas outlet 121 of the lower end plate 109b.

Hereinbefore, according to the present embodiment, the gas outlet hole 131 is provided in the center portion of the separator 108 corresponding to the position enclosed by the four power generation cells 105a to 105d, which can prevent the exhaust gases discharged from the outer peripheral portion of the power generation cells 105a to 105d from remaining around the center portions of the separator 108 and can vertically flow inside the exhaust gas flow channel 130 through the gas outlet hole 131.

Accordingly, the reactant gases are smoothly supplied from outside to individual power generation cells 105, thereby improving the power generation performance of the individual power generation cells 105a to 105d; in the stack's middle portion having a relatively high temperature, the exhaust gases flow into the above gas outlet hole 131, which can improve the heat dissipating properties of the power generation cells 105a to 105d, thereby reducing the temperature in the stack's middle portion, and relaxing the thermal stress to the individual component such as the power generation cells 105a to 105d and the separators 108, thereby improving the durability and the reliability of the fuel cell stack 101; and in the stack's end portion having a low temperature, heat of the exhaust gases flowing up and down increases the temperature of the stack, thereby decreasing the temperature distribution (equalizing the heat) in the lamination direction of the stack.

Particularly, the size of the gas outlet hole 131 of the separator 108 located at the upper end portion of the stack is made smaller than the size of other gas outlet holes 131, and thus the amount of exhaust gas passing through the upper end of the exhaust gas flow channel 130 is reduced, thereby causing the exhaust gas flow channel 130 to generate downward exhaust gas flow.

Figure 13:
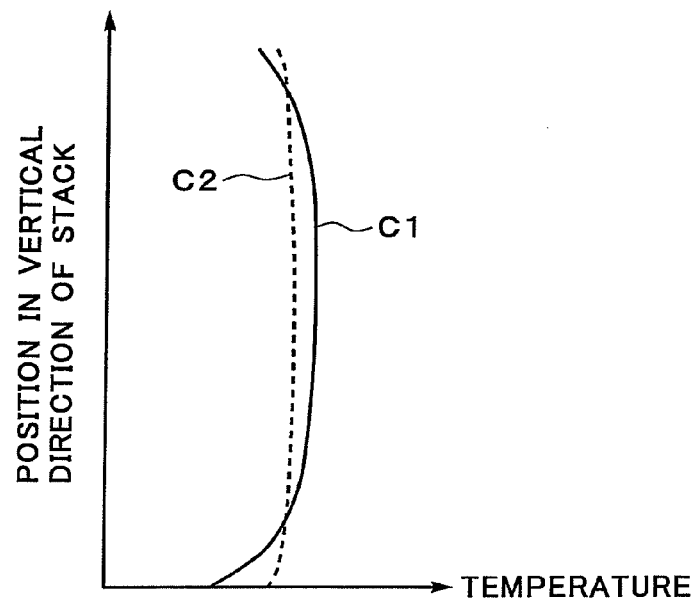
FIG. 13 is a drawing showing a temperature distribution in the lamination direction of the stack.

As shown by C2 in FIG. 13, the exhaust gases flowing downward heat the stack's lower end portion having the lowest temperature to increase the temperature of the position. As a result, the power generation performance of the power generation cells 105a to 105d at the stack's lower end portion is improved, thereby improving the total power generation performance of the fuel cell stack 101.

Further, the gas outlet 121 is provided in the lower end plate 109b so as to discharge the exhaust gases outside the stack from the lower end portion of the exhaust gas flow channel 130, and thus the exhaust gases smoothly flow downward inside the exhaust gas flow channel 130, thereby efficiently increasing the temperature of the stack's lower end portion.

In this case, as shown in FIG. 9, a plate-shaped cover mechanism 129 for covering the gas outlet hole 131 of the separator 108 located at the upper end portion of the stack is movably provided so as to make the opening of the gas outlet hole 131 adjustable.

The cover mechanism 129 is used to adjust the opening of the gas outlet hole 131 according to the state (i.e., number of laminated layers in the stack and electrical power density) of the temperature distribution in the lamination direction of the stack. More specifically, the amount of gases flowing upward and the amount of gases flowing downward inside the exhaust gas flow channel 130 can be appropriately adjusted to balance the temperature at both ends of the stack, thereby more reliably reducing the temperature distribution in the lamination direction of the stack.

Further, according to the present embodiment, the description has been given to the vertical installation type of fuel cell stack 101, but, of course, the present invention may be applied to a horizontal installation type of fuel cell stack with a horizontal lamination direction. In this case, an exhaust gas flow channel is formed in which the exhaust gases after power generation reaction flow in a horizontal direction inside the stack. According to the fuel cell stack of the present configuration, in the stack's middle portion having a relatively high temperature, the heat dissipating properties of the power generation cell is improved, thereby reducing the temperature in the stack's middle portion; and in the stack's end portion having a low temperature, the heat of the exhaust gases flowing in a horizontal direction increases the temperature of the stack's end portion, thereby decreasing the temperature distribution in the lamination direction of the stack.

INDUSTRIAL APPLICABILITY

According to the first aspect of the present invention, the structure of the solid oxide fuel cell can be simplified as well as the power generation cell can be prevented from being broken.

According to the second aspect of the present invention, the temperature in the lamination direction of the stack can be equalized, thereby improving the power generation performance of the power generation cell located in the stack's end portion.

The invention claimed is:

1. A solid oxide fuel cell comprising:
   a separator which includes a fuel gas passageway and an oxidant gas passageway thereinside; and
   a plurality of power generation cells arranged in a parallel connection state on the same plane, each of the power generation cells having a solid electrolyte layer sandwiched between a fuel electrode layer and an oxidant electrode layer,
   wherein the plurality of power generation cells are laminated by the separator,
   wherein the solid oxide fuel cell includes an oxidant gas manifold and a fuel gas manifold communicatively connected to the oxidant gas passageway and the fuel gas passageway of the separator and penetrating in a lamination direction,
   wherein the separator includes an oxidant gas hole communicatively connected to the oxidant gas manifold and a fuel gas hole communicatively connected to the fuel gas manifold,
   wherein a first end of the oxidant gas passageway is communicatively connected to the oxidant gas hole, and a second end of the oxidant gas passageway is open at a portion facing the respective oxidant electrode layer,
   wherein the oxidant gas passageway is divided at the second end thereof or a plurality of oxidant gas passageways are provided at the second end thereof,
   wherein a first end of the fuel gas passageway is communicatively connected to the fuel gas hole, and a second end of the fuel gas passageway is open at a portion facing the respective fuel electrode layer,
   wherein the fuel gas passageway is divided at the second end thereof or a plurality of fuel gas passageways are provided at the second end thereof,
   wherein the plurality of power generation cells are arranged up-down and left-right symmetrically at a center portion of the separator,
   wherein the oxidant gas hole and the fuel gas hole are arranged, respectively, in a pair of corner portions of the separator, and
   wherein the oxidant gas passageway starts at an edge portion of the separator, extends to a central portion of the separator at a position enclosed by the power generation cells, is divided at the central portion, and is introduced in a portion facing the respective oxidant electrode layer.

2. The solid oxide fuel cell of claim 1, wherein the corner portions of the separator at which the oxidant gas hole and the fuel gas hole are arranged are opposite to each other, and the center portion of the separator is disposed between the oxidant gas hole and the fuel gas hole.

3. The solid oxide fuel cell of claim 1, wherein the fuel gas passageway is divided into two branches in a direction orthogonal to a passage direction and is introduced into a portion facing the respective fuel electrode layer.

4. The solid oxide fuel cell of claim 3, wherein a cross sectional area of each branch is reduced.

5. The solid oxide fuel cell of claim 1, wherein the oxidant gas passageway and the fuel gas passageway are divided into branches, and a cross sectional area of each branch is reduced.

6. The solid oxide fuel cell of claim 1, wherein the oxidant gas passageway is divided into a plurality branches at the central portion, and
   wherein the branches of the oxidant gas passageway are introduced to the oxidant electrode layers of the power generation cells, respectively.

7. The solid oxide fuel cell of claim 6, wherein the fuel gas passageway is divided into a plurality branches, and
   wherein the branches of the fuel gas passageway are introduced to the fuel electrode layers of the power generation cells, respectively.

8. A solid oxide fuel cell comprising:
   a separator which includes a fuel gas passageway and an oxidant gas passageway thereinside; and
   a plurality of power generation cells arranged in a parallel connection state on the same plane, each of the power generation cells having a solid electrolyte layer sandwiched between a fuel electrode layer and an oxidant electrode layer,
   wherein the plurality of power generation cells are laminated by the separator,
   wherein the solid oxide fuel cell includes an oxidant gas manifold and a fuel gas manifold communicatively connected to the oxidant gas passageway and the fuel gas passageway of the separator and penetrating in a lamination direction,
   wherein the separator includes an oxidant gas hole communicatively connected to the oxidant gas manifold and a fuel gas hole communicatively connected to the fuel gas manifold,
   wherein a first end of the oxidant gas passageway is communicatively connected to the oxidant gas hole, and a second end of the oxidant gas passageway is open at a portion facing the respective oxidant electrode layer,
   wherein the oxidant gas passageway is divided at the second end thereof or a plurality of oxidant gas passageways are provided at the second end thereof,
   wherein a first end of the fuel gas passageway is communicatively connected to the fuel gas hole, and a second end of the fuel gas passageway is open at a portion facing the respective fuel electrode layer,
   wherein the fuel gas passageway is divided at the second end thereof or a plurality of fuel gas passageways are provided at the second end thereof,
   wherein an oxidant gas hole communicatively connected to the oxidant gas manifold is arranged in a position enclosed by the power generation cells, and
   wherein a plurality of the oxidant gas passageways are provided, each of which is introduced from the position enclosed by the power generation cells to a portion facing the oxidant electrode layer of a respective one of the power generation cells.

9. A solid oxide fuel cell comprising:
   a separator which includes a fuel gas passageway and an oxidant gas passageway thereinside; and a plurality of power generation cells arranged in a parallel connection state on the same plane, each of the power generation cells having a solid electrolyte layer sandwiched between a fuel electrode layer and an oxidant electrode layer, wherein the plurality of power generation cells are laminated by the separator, wherein the solid oxide fuel cell includes an oxidant gas manifold and a fuel gas manifold communicatively connected to the oxidant gas passageway and the fuel gas passageway of the separator and penetrating in a lamination direction, wherein the separator includes an oxidant gas hole communicatively connected to the oxidant gas manifold and a fuel gas hole communicatively connected to the fuel gas manifold, wherein a first end of the oxidant gas passageway is communicatively connected to the oxidant gas hole, and a second end of the oxidant gas passageway is open at a portion facing the respective oxidant electrode layer, wherein the oxidant gas passageway is divided at the second end thereof or a plurality of oxidant gas passageways are provided at the second end thereof, wherein a first end of the fuel gas passageway is communicatively connected to the fuel gas hole, and a second end of the fuel gas passageway is open at a portion facing the respective fuel electrode layer, wherein the fuel gas passageway is divided at the second end thereof or a plurality of fuel gas passageways are provided at the second end thereof, and wherein the power generation cell has a sealless structure in which gases remaining unconsumed by power generation reaction are discharged outside from a peripheral portion of the power generation cell, and a gas outlet hole penetrating the separator in a thickness direction is provided in a center portion of the separator corresponding to a position enclosed by the plurality of power generation cells.

10. The solid oxide fuel cell of claim 9, wherein the oxidant gas passageway passes through a center portion of the separator at a position enclosed by the power generation cells, and
wherein the oxidant gas passageway is introduced into a portion facing the respective oxidant electrode layer.

11. The solid oxide fuel cell of claim 10, wherein at least the fuel gas passageway is divided into two in a direction orthogonal to the passage direction and is introduced into a portion facing the respective fuel electrode layer.

12. The solid oxide fuel cell of claim 9, wherein the fuel gas passageway is divided into two branches in a direction orthogonal to a passage direction and is introduced into a portion facing the respective fuel electrode layer.

13. The solid oxide fuel cell of claim 12, wherein a cross sectional area of each branch is reduced.

14. The solid oxide fuel cell of claim 9, wherein the oxidant gas passageway and the fuel gas passageway are divided into branches, and a cross sectional area of each branch is reduced.

15. The solid oxide fuel cell of claim 9, wherein the oxidant gas passageway is divided into a plurality branches at the central portion, and
wherein the branches of the oxidant gas passageway are introduced to the oxidant electrode layers of the power generation cells, respectively.

16. The solid oxide fuel cell of claim 15, wherein the fuel gas passageway is divided into a plurality branches, and
wherein the branches of the fuel gas passageway are introduced to the fuel electrode layers of the power generation cells, respectively.

17. A fuel cell stack comprising:
a separator;
a plurality of power generation cells disposed on the same plane, the plurality of power generation cells being laminated by the separator; and
an exhaust gas flow channel formed inside the fuel cell stack for flowing an exhaust gas after power generation reaction in a lamination direction,
wherein the amount of gas flow in the exhaust gas flow channel to one side of the fuel cell stack in the lamination direction is made larger than the amount of gas flow to the other side of the fuel cell stack in the lamination direction,
wherein each of the power generation cells has a sealless structure in which exhaust gases after power generation reaction are discharged from a peripheral portion thereof, and
wherein a gas outlet hole penetrating in a lamination direction is provided in a portion of the separator corresponding to a position enclosed by the plurality of power generation cells, and the exhaust gas flows in a lamination direction through the gas outlet hole.

18. The fuel cell stack of claim 17, wherein the separator is a first separator disposed on a first side of the power generation cells, and the fuel cell stack further comprises a second separator disposed on a second side of the power generation cells,
wherein the second separator includes a gas outlet hole, and
wherein the size of the gas outlet hole of the first separator is smaller than the size of the gas outlet hole of the second separator.

19. The fuel cell stack of claim 18, further comprising a cover mechanism for adjusting an opening of the gas outlet hole of the first separator.

20. The fuel cell stack of claim 17, wherein the fuel cell stack has two ends,
wherein the fuel cell stack further comprises two end plates disposed, respectively, at the two ends of the fuel cell stack, and
wherein a gas outlet for discharging an exhaust gas inside the exhaust gas flow channel to outside the fuel cell stack is provided in one of the end plates.

* * * * *